(12) United States Patent
Hiatt et al.

(10) Patent No.: US 11,117,057 B2
(45) Date of Patent: Sep. 14, 2021

(54) SERVER-BASED GAME ACTIVITY SUGGESTIONS BY READINESS SCORE

(71) Applicant: SONY INTERACTIVE ENTERTAINMENT INC., Tokyo (JP)

(72) Inventors: Daniel S. Hiatt, San Francisco, CA (US); Adil Ahmed Sherwani, Oakland, CA (US); Xiaohan Zhang, Albany, CA (US); Jay Robert Franck, San Francisco, CA (US); Rui Li, Milpitas, CA (US); Gabor S. Melli, San Francisco, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 11 days.

(21) Appl. No.: 16/687,309

(22) Filed: Nov. 18, 2019

(65) Prior Publication Data

US 2021/0146239 A1    May 20, 2021

(51) Int. Cl.
| | | |
|---|---|---|
| *A63F 13/79* | (2014.01) | |
| *A63F 13/335* | (2014.01) | |
| *A63F 13/35* | (2014.01) | |
| *A63F 13/497* | (2014.01) | |
| *A63F 13/32* | (2014.01) | |
| *A63F 13/77* | (2014.01) | |
| *A63F 9/00* | (2006.01) | |

(52) U.S. Cl.
CPC .............. *A63F 13/79* (2014.09); *A63F 13/32* (2014.09); *A63F 13/335* (2014.09); *A63F 13/35* (2014.09); *A63F 13/497* (2014.09); *A63F 13/77* (2014.09); *A63F 2009/0039* (2013.01)

(58) Field of Classification Search
CPC ...... A63F 13/35; A63F 13/335; A63F 13/352; A63F 13/32; A63F 13/497; A63F 13/77; A63F 13/79
See application file for complete search history.

(56) References Cited

U.S. PATENT DOCUMENTS

| | | | |
|---|---|---|---|
| 10,279,264 B1* | 5/2019 | Aghdaie | A63F 13/5375 |
| 10,857,464 B2* | 12/2020 | Sulakhe | A63F 13/26 |
| 2005/0246638 A1* | 11/2005 | Whitten | A63F 13/5375 |
| | | | 715/708 |
| 2007/0294089 A1* | 12/2007 | Garbow | G06Q 30/0216 |
| | | | 705/26.1 |
| 2010/0041475 A1* | 2/2010 | Zalewski | A63F 13/5375 |
| | | | 463/30 |
| 2011/0306395 A1* | 12/2011 | Ivory | A63F 13/67 |
| | | | 463/1 |

(Continued)

*Primary Examiner* — Justin L Myhr
(74) *Attorney, Agent, or Firm* — Kilpatrick Townsend & Stockton LLP

(57) ABSTRACT

Techniques for improving a user video game experience are described. In an example, a computer system receives event data from a plurality of user devices. Each event data includes an identifier of an activity in a video game and data and an identifier of a mechanic used to complete the activity. The identifiers can be predefined in program code of the video game. The identifiers data can be received based on an execution of the program code. The event data is processed to determine, for a user that has not completed the activity, a readiness of the user to perform the activity. Depending on the readiness, the activity can be suggested in a user interface element.

20 Claims, 14 Drawing Sheets

(56) References Cited

U.S. PATENT DOCUMENTS

| | | | |
|---|---|---|---|
| 2012/0021840 A1* | 1/2012 | Johnson | A63F 13/497 463/43 |
| 2013/0005452 A1* | 1/2013 | Chatani | A63F 13/35 463/29 |
| 2020/0139239 A1* | 5/2020 | Lee | A63F 13/822 |

* cited by examiner

SERVER-BASED GAME ACTIVITY SUGGESTIONS BY READINESS SCORE

BACKGROUND

Video games are available on different computing devices. For example, a user operates a video game console and a mobile device to play a first video game and a second video game, respectively. In addition, video games are available from different sources. For example, the video game console is operable to play multiple video games from two or more different video game developers.

Given the increasing number of video games and their availability on different computing devices and from different sources, the user experience typically changes. For example, the way game play help may be sought can vary significantly between video games. In addition, the way a particular part of a video game is surfaced on a computing device as being available for playing can be unique to the particular video game.

Hence, the user experience may not be common between the video game players. There is a need for improving the user experience such that, regardless of the underlying video games, some commonality in video game functionalities becomes possible.

BRIEF SUMMARY

Techniques for improving a user video game experience are described. In an example, a computer system is used for presentation of video game-related information. The computer system includes one or more processors and one or more non-transitory computer readable storage media (e.g., one or more memories) storing instructions that, upon execution by the one or more processors, cause the computer system to perform operations.

In an example, the operations include receiving an activity identifier of an activity in a video game, a player identifier of a video game player that completed the activity, and a mechanic identifier of a mechanic used by the video game player to complete the activity. The mechanic includes at least one of: a set of tools, a set of capabilities, or a set of skills available in the video game. The activity identifier and the mechanic identifier are predefined in program code of the video game. The activity identifier, the player identifier, and the mechanic identifier are received based on an execution of the program code. The operations also include storing the activity identifier, the player identifier, and the mechanic identifier in a data store. The operations also include determining that a user has not completed the activity, determining, from the data store and based on the activity identifier, at least one of: mechanics of video game players that completed the activity, or statistics about characteristics of the video game players in the video game, and determining at least one of: mechanics available to the user, or statistics about characteristics of the user in the video game. The operations also include generating a readiness score for the user to complete the activity based on at least one of: the mechanics of the video game players and the mechanics of the user, or the statistics of the video game players and the statistics of the user, ranking, based on the readiness score, the activity relative to other activities in the video game that have not been completed by the user and are available to the user, and presenting information about the activity on a device of the user based on the ranking.

In an example, presenting the information includes presenting a user interface element that suggests the activity to the user and that embeds a selectable link to launch the activity in the video game.

In an example, presenting the information includes presenting a user interface element that suggests the activity to the user and that embeds a selectable link to view a completion of the activity in the video game.

In an example, the operations further include estimating a length of time for completing the activity by the user based on a type of the activity and data about actual completion times of the video game players. The activity is ranked further based on the estimated length of time. In this example, presenting the information includes identifying the activity and showing the estimated length of time.

In an example, ranking the activity includes generating a total score for the activity based on a weighted sum of individual scores. Each individual score corresponds to a sort factor applied to the activity and is associated with a weight. Ranking the activity also includes determining that the activity has the highest total score among the other activities. In this example, weights associated with the sort factors are personalized to the user. In this example also, weights associated with the sort factors are predefined based on a developer of the video game. In this example also, weights associated with the sort factors are adjusted based on an activity selection history of the video game players. In this example also, the sort factors include a readiness of the user to complete the activity and at least one of: a length of time estimated for the user to complete the activity, a propensity to play a type of the activity, a first availability date of the activity, an expiration date of the activity, a virtual zone within the video game for the activity, and a developer-defined priority of the activity.

In an example, the operations ranking the activity includes generating a total score for the activity based on individual scores generated for sort factors and weights associated with the sort factors. The sort factors include a readiness of the user to complete the activity. In this example, the readiness score is generated for the readiness of the user by at least one of: determining a match between a first mechanic used by the video game players to complete the activity and a second mechanic available to the user, or determining that the statistics of the video players indicate a characteristic of the video game players when the activity was completed and that the statistics of the user when playing the video game include the characteristic. In this example, the readiness score is generated further based on a history of the user using the second mechanic in the video game.

In an example, ranking the activity includes generating a total score for the activity based on individual scores generated for sort factors. The individual scores include the readiness score and a propensity score. The propensity score is generated by at least: determining a type of the activity from a plurality of types, the plurality of types including a progress activity, a competitive activity, a challenge activity, and an open ended activity, and determining a history of the user completing the type of activity.

In an example, ranking the activity includes generating a total score for the activity based on individual scores generated for sort factors. The individual scores include the readiness score and a location score. The location score is generated by at least: determining a virtual zone within the video game where the activity was completed, and determining that a virtual location of the user in the video game is within the virtual zone.

In an example, ranking the activity generating a total score for the activity based on individual scores generated for sort factor. The individual scores include the readiness score and a location score. The location score is generated by at least: determining a first coordinate within the video game associated with the completion of the activity by the video game players, determining a second coordinate of the user within the video game, and determining that a difference between the first coordinates and the second coordinate is less than a distance threshold.

In an example, ranking the activity generating a total score for the activity based on individual scores generated for sort factors. The individual scores include the readiness score and a playtime length score. The playtime length score is generated by at least: estimating a length of time of the activity, and determining a propensity to select the activity based on the length of time and on at least one of: a selection history of activities by the video game players or a selection history of activity by the user.

In an example, the other activities include a second activity. In this example, the operations further include: determining that the second activity includes a spoiler for the user, and ranking the second activity lower than the activity based on the spoiler.

DETAILED DESCRIPTION

Figure 1:
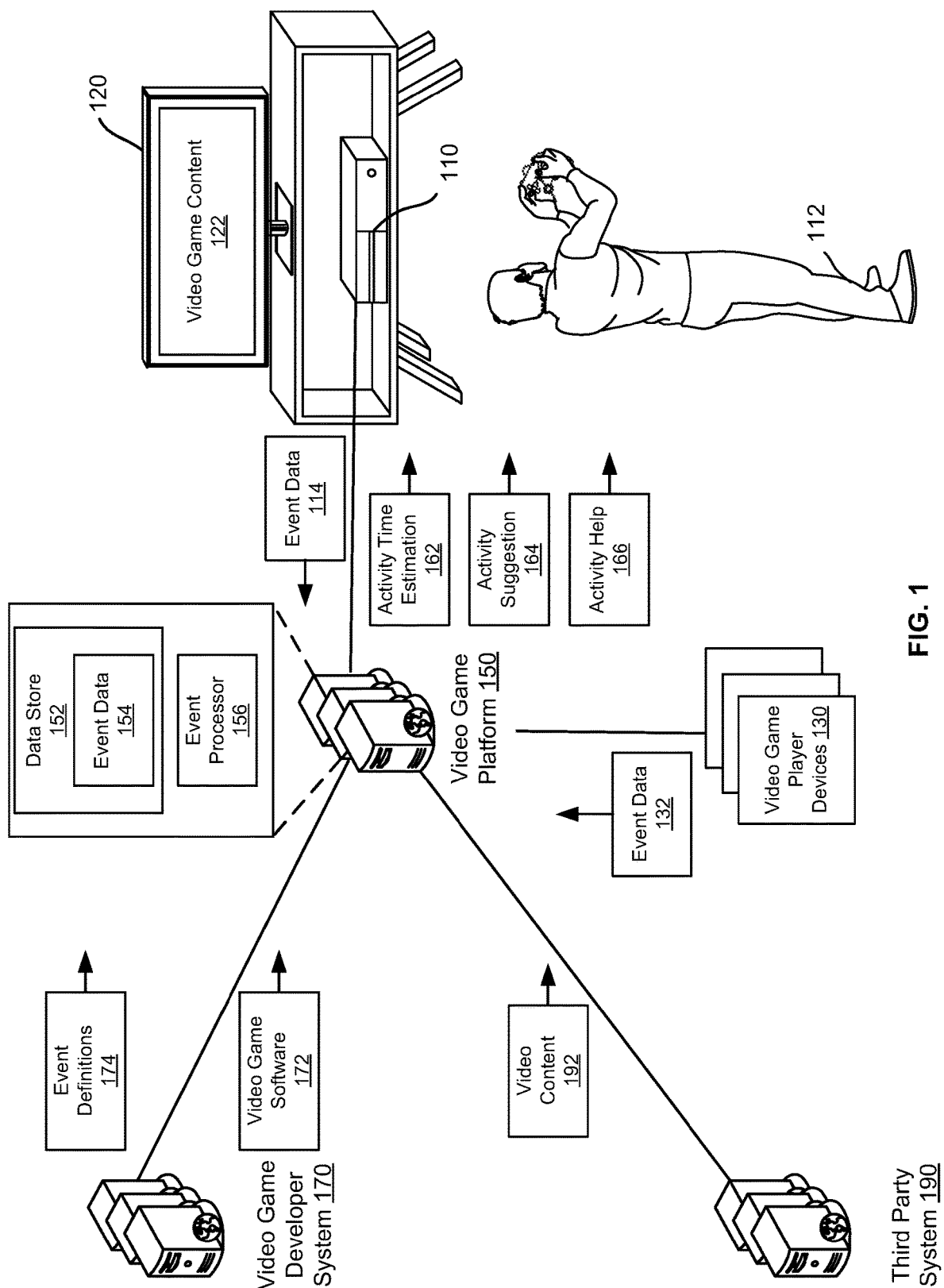
FIG. 1 illustrates an example of a computing environment for collecting and processing video game events, according to embodiments of the present disclosure.

Generally, systems and methods for improving a user video game experience are described. In an example, the user video game experience is improved by providing a unified way for, among other things, multiple video game functionalities, such as for suggesting video game activities, estimating completion time for such activities, and presenting video game help regardless of the underlying video games. This unified way need not change how a video game is developed or necessitate a common approach to video game development. Instead, instrumentation of various events in the video games is relied upon, where a video game platform (e.g., a server-based video game service) can collect and process such events based on the execution of the video games to suggest the video game activities, estimate completion times, and present the video game help at a client level and, as needed, to customize such video game functionalities to the client level.

For instance, a video game includes a plurality of activities. When an instance of the video game is executed for a video game player (whether locally on a computing device of the video game player or remotely on the video game platform), the video game platform receives events about played activities. Each event can identify the activity, mechanics (e.g., a set of tools, a set of capabilities, or a set of skills available in the video game) and the video game player and can include other activity-related data (e.g., start time, end time, success failure, etc.). Events for multiple activities and multiple video game players are stored over time in a data store. For a user that has not completed an activity of the video game, the video game platform generates a readiness score indicating the likelihood of the user being ready to complete the activity. The readiness score can be generated based on the events stored for the activity. In particular, data from the events can be processed according to multiple sort factors to generate an individual score per sort factor, and the individual scores can be summed based on weights to generate the readiness score. The activity can be ranked against other possible activities. Based on its ranking, the video game platform can send information to a computing device to present the activity as a suggestion in a graphical user interface (GUI) element. A user selection of the GUI (or a link therein) can trigger a launch of the activity. Such activity suggestion can be performed per activity and across different video games and can be presented at different computing devices of the user. Hence, the same type of video functionality (e.g., activity can be surfaced to the user (as long as the relevant events are collected), whereby the most relevant activities are suggested possibly within a single video game or across multiple video games.

To illustrate, consider an example of a video game activity related to capturing a flag of an adversary. The activity may include entering a location that includes the flag and clearing an obstacle in the location. Given the events from multiple players, the video game platform determines that frequently used mechanics to successfully capture the flag include a sledgehammer to break an entrance door and a rope to climb over the obstacle. The video game platform also determines that a high frequency of the video game players that have completed the activity had a particular characteristic (e.g., were expert players). In comparison, the video game platform determines that the two mechanics is available to the user in the video game and that the user is also associated with the particular characteristic. Other sort factors can be determined including, for instance, the estimated time to capture the flag, the familiarity of the user with using the sledgehammer and rope, a history of the user playing similar activities, and the like. Given the different sort factors, including the mechanics and particular characteristics, the video game platform generates a readiness score and ranks the activity against other candidate activities according to similarly generated readiness scores. By determining that the activity has the highest rank, the video game platform may generate and send a notification to a computing device of the user, where the notification suggests the activity.

Embodiments of the present disclosure provide many technical advantages over existing video game platforms. In particular, the user interface (e.g., GUI) is improved relative to existing user interfaces because relevant activity suggestions can be presented therein in a common manner across different applications and different computing devices. For instance, by collecting events per activity, video game, and video game player, a video game platform of the present disclosure can accurately determine a user readiness to complete an activity. Because an accurate determination can be performed, multiple video game functionalities become possible. In particular, a relevant activity for the user can be presented on the user interface in a presentation manner common to other relevant activities (in the video game and other video games) and to different types of computing devices (e.g., the same information can be surfaced on a video game console and on a mobile device). Hence, different relevant activities can be suggested in a common manner across the video games and computing devices.

In the interest of clarity of explanation, embodiments of the present disclosure are described in connection with generating and presenting suggestions about activities available in video games. However, the embodiments are not limited as such. Instead, the embodiments similarly apply to other types of activities. For instance, the embodiments similarly apply to suggest other activities available from the video game platform. These activities can relate to, by way of example, video streaming, audio streaming, social media communications, application and/or title downloads, application and/or title installations, and/or other types of functionalities available from an application hosted by the video game platform. Generally, event data about an activity can be collected based on the activity (or instances thereof) being executed for a plurality of users. The event data can be processed for a user based on a set of sort factors to determine a readiness score and an activity suggestion can be sent to a computing device of the user based on the readiness score.

FIG. 1 illustrates an example of a computing environment for collecting and processing video game events, according to embodiments of the present disclosure. As illustrated, the computing environment includes a video game console 110, video game player devices 130, a video game platform 150, a video game developer system 170, and a third party system 190. Video games are available to the video game console 110 from the video game developer system 170 through the video game platform 150. Video content, such as help videos demonstrating how video game activities can be played, is also available to the video game console 110 from the third party system 190 through the video game platform 150. The video game platform 150 collects, stores, and processes events from the video game player devices 130 and the video game console 110 to provide various video game-related functionalities including, for instance, suggesting video game activities, estimating completion time for such activities, and presenting video game help.

In an example, the video game console 110 represents a computing device available to a user 112 and operable to interact with one or more applications including video games. A display 120 communicatively coupled or integrated with the video game console 110 can present video game-related data, including video game content 122, to the user 112. Other types of computing devices can be available to the user 112 including for instance, a smartphone, a tablet, a laptop, a desktop computer, or other devices with suitable memories and processors.

The video game console 110 can execute a video game locally to present the video game content 122 on the display 120. Additionally or alternatively, the video game consoles 110 can receive the video game content 122 based on an execution of an instance of the video game application on the video game platform 150, the video game developer system 170, or another remote computer system. The video game can also be downloadable to the video game console 110 from such systems.

Further, the video game console 110 can, directly or through the video game platform 150, download or stream video content from the third party system 190 for presentation on the display 120. An example of video content includes a video file generated by the video game developer 170 and uploaded to the third party system 190, where this video file demonstrates how a video game can be played, a set of activities in the video game can be played, or a set of mechanics in an activity can be used to play the activity. A mechanic generally represents at least one of a set of tools, a set of capabilities, or a set of skills available to play an activity or a portion of an activity. Another example of video content includes a video file generated by one of the video game player devices and uploaded to the third party system 190 directly or through the video game platform 190, where the video file records the game play of a video game player operating the video game player device. Likewise, a similar video file can be uploaded to the third party system 190 from the video game console 110.

In an example, the video game player devices 130 represent computing devices of video game players that may, but need not, include the user 112. Similar functionalities can be provided on each one of the video game player devices and the video game console 110.

In an example, the video game system 170 represents a computer system that includes a set of computing resources for developing video games and available to a video game developer. In particular, the video game system 170 can store video game software 172, upload such software 172 to the video game platform 150, and/or download such software 172 to the video game console 110.

The video game software 172 of a video game is program code executable to present and interact with video game content of the video game. The program code can include predefined instrumentations to generate events upon the execution of the program code. In particular, the program code includes a set of event definitions 174, where an event definition represents code defining an identifier of an event and data to be reported for the event. Examples of such event definitions 174 are further described herein below and are predefined in the program code of the video game according to event templates available from the video game platform 150. Such event templates can be defined by a service provider of the video game platform 150 and can be commonly used across multiple video game developer systems 170.

In an example, the third party system 190 represents a computer system, such as one or more content servers, for providing video content 192 to the video game console 110 directly or indirectly through the video game platform 150. As explained herein above, the video content 192 can include video files demonstrating how a video game can be played, a set of activities in the video game can be played, or a set of mechanics in an activity can be used to play the activity. The video content 192 can be uploaded to the third party system 190 from the video game developer system 170, the video game console 110, and/or one or more of the video game player devices 130 directly or indirectly through the video game platform 150.

In an example, the video game platform 150 represents a computer system that provides various video-game related functionalities to the video game console 110. For instance, the video game platform 150 is set-up as a hub between the video game console 110, the video game player devices 130, the video game developer system 170, and third party system 190. In particular, the video game software 172 and the video content 192 can be downloaded to the video game consoler 110 through the video game platform 150. An instance of a video game based on video game software stored on the video game platform 150 can be instantiated for the video game console 110. A video file can be streamed through the video game platform 150 to the video game console 110. And communications data (e.g., messages, commands, etc.) can be exchanged between the video game console 110 and the video game player devices 130 through the video game platform 150.

Furthermore, the video game platform receives event data 114 from the video game console 110 and event data 132 from the video game player devices 130 and stores such received data in a data store 152 as event data 154. An event processor 156 of the video game platform 150 processes the event data 154 to generate and send any of an activity time estimation 162, an activity suggestion 164, and an activity help 166 to the video game console 110 for presentation on the display 120.

Received event data (any of the event data 114 or event data 132) represents data reported from a device (e.g., the video game console 110 or one of the video game player devices 130 as application) for an event based on an execution of program code of a video game, where the program code includes an event definition for the event. The activity time estimation 162 represents an estimated length of time to complete an activity in the video game, which may be referred to herein as completion time. The activity suggestion 164 represents information suggesting an activity available to the user 112 in the video game and not previously performed or completed by the user 112. An activity help 166 includes information, such as a video file, textual description, and/or a graphical description about completing an activity in the video game or using a mechanic in at least a portion of the activity. The processor 156 executes logic that, for instance, performs a statistical analysis across a subset of the event data 154 associated with the activity to generate the activity time estimation 162, the activity suggestion 164, and the activity help 166. In addition, the processor 156 can execute logic that customizes any of the activity time estimation 162, the activity suggestion 164, or the activity help 166 based on a context of the user 110 in the video game and/or within the platform and on the type of the video game console 110.

Generally, an activity is a unit of game play inherent to the structure of a video game. Different categories of activities exist including progress activities, competitive activities, challenge activities, and open ended activities. The activity can be defined in a program code as object with multiple properties. The properties include an activity identifier, a name, and a category. The activity identifier is a unique identifier of the activity. When an event about the activity is reported to the video game platform 150, the corresponding event data refers to the activity identifier. The name can be a short localized name of the activity. Other properties are possible including, for instance, a description (e.g., a longer description of the activity), an image of the activity, a default availability (e.g., whether the activity is available to all video game players before launching the video game), whether completion of the activity is required to complete the video game, whether the activity can be played repeatedly in the video game, and nested Tasks (child activities, also referred to herein as sub-activities). Multiple events about the activity are possible.

An example of an event about the activity can indicate changes in activity availability for a video game player (e.g., the user 112). This is primarily used to decide what activities to display and to remove spoiler block for those activities (where an activity having a spoiler may not be surfaced to the video game player). A property of this event includes, for instance a list (e.g., array) of activities that are currently available.

An example of an event about the activity can indicate that the video player is currently participating in the activity or task (e.g., a child activity). A property of this event includes, for instance the activity identifier of the activity. Another property can optionally be a time corresponding to the start of the participation in the activity.

An example of an event about the activity can indicate the end of the activity or task (e.g., a child activity). A property of this event includes, for instance the activity identifier of the activity. Another property can optionally be a time corresponding to the end of the participation in the activity. Yet another property can optionally be an outcome of the activity, such as completed, failed, or abandoned.

The video game platform 150 can also collect data about a zone in a video game, where this data is reported similarly to the events based on predefinitions in program code of the video game. The zone represents an area of a game world of the video game (e.g., a virtual world) with a single coordinate system. The zone may have a two-dimensional (2-D) map image associated with it, used to display locations on the zone. The zone can be defined in the program code as an object with multiple properties. The properties include a zone identifier and a name. The zone identifier is a unique identifier of the zone. The name can be a short localizable name of the zone. Other properties are possible including, for instance, an indication of whether the object should be treated as hidden for spoiler block uses cases (the default may be set to false), a map (e.g., a high resolution image for the zone 2-D map), a view projection (e.g., a matrix (4×4) to convert from three-dimensional (3-D) work coordinates to 2-D map position), and an image (e.g., a display image for the zone if different from the map). Multiple events about the zone are possible.

An example of an event about the zone can indicate an update to the current in-game location of the video game player. This event can be reported regularly, or whenever the player's in-game location changes significantly. A property of this event includes the zone identifier. Other properties are possible, such as optionally position (e.g., x,y,z position of the video game player character (the virtual player of the video game player) in the zone) and orientation (e.g., x,y,z vector indicating the video game player character's direction).

Another example of an event about the zone can indicate the video game player's zone, location, and orientation, at the time of starting the activity. This event can enable location-based help. A property of this event includes the activity identifier. Other properties are possible, such as optionally the zone identifier and the position and orientation of video game player's character in the video game.

Yet another example of an event about the zone can indicate the video game player's zone, location, and orientation, at the time of ending the activity. This event can also enable location-based help. A property of this event includes the activity identifier. Other properties are possible, such as optionally the outcome of the activity, the zone identifier, and the position and orientation of video game player's character in the video game.

The video game platform 150 can also collect data about an actor in a video game, where this data is reported similarly to the events based on predefinitions in program code of the video game. The actor represents an entity with behaviors in the video game. The actor can be player-controlled or game-controlled, and this can change dynamically during game play. The actor can be defined in the program code as an object with multiple properties. The properties include an actor identifier and a name. The actor identifier is a unique identifier of the actor. The name can be a localizable name of the actor. Other properties are possible including, for instance, an indication of whether the object should be treated as hidden for spoiler block uses cases (the default may be set to false), an image of the actor, and a short description of the actor. Multiple events about the actor are possible.

An example of an event about the actor can indicate that a change to the video game player's selection of actor(s). Selected actors represent the actors the video game player is controlling in the video game, and can be displayed on the video game player's profile and other presentation spaces. There can be more than one actor selected at a time. The video game should replace the list of actors upon loading save data. A property of this event includes a list (e.g., array) of actors which are currently selected by the video game player.

The video game platform 150 can also collect data about a mechanic in a video game, where this data is reported similarly to the events based on predefinitions in program code of the video game. The mechanic represents an item (e.g., tool), capability, skill, or effect that can be used by the video game player or the video game to impact game play (e.g. bow, arrow, stealth attack, fire damage). The mechanic generally excludes items that do not impact game play (e.g. collectibles). The mechanic can be defined in the program code as an object with multiple properties. The properties include a mechanic identifier and a name. The mechanic identifier is a unique identifier of the mechanic. The name can be a short localizable name of the mechanic. Other properties are possible including, for instance, an indication of whether the object should be treated as hidden for spoiler block uses cases (the default may be set to false), an image of the mechanic, and a short description of the mechanic. Multiple events about the mechanic are possible.

An example of an event about the mechanic can indicate that mechanics available to the video game player have changed. Availability of a mechanic represents that the mechanic is available in the game world for the video game player to use, but may necessitate the video game player to go through some steps to acquire it into inventory (e.g. download from a store, pick up from the world) before using it. This event can also be used to indicate lifting of spoiler block on the mechanic object, and to filter help tips to avoid suggesting use of a mechanic that is unavailable. The video game should replace the list of mechanics upon loading save data. A property of this event includes a list (e.g., array) of mechanics which are currently available.

Another example of an event about the mechanic can indicate that the video game player's inventory has changed. Inventory refers to mechanics that are immediately usable to the video game player without having to take additional steps in the video game before using it. Inventory information can be used to estimate a player's readiness for an activity. The video game should replace the list of inventory upon loading save data. A property of this event includes a list (e.g., array) of mechanics which are currently in inventory.

Yet another example of an event about the mechanic can indicate that the video game player's load out has changed. Load out represents the mechanics that are most immediately accessible to the video player, and is the subset of inventory which is displayable to the video game player. The video game should replace the list of mechanics upon loading save data. A property of this event includes a list (e.g., array) of mechanics which are now part of the active load out.

A further example of an event about the mechanic can indicate that the mechanic has been used by or against the video game player. Properties of this event include a list (e.g., array) of mechanics which were used (e.g. fire arrow, fire damage) and whether the mechanics were used by or against the video game player. Other properties are possible, such as optionally an initiator actor identifier (e.g., an identifier of the actor that initiated the use of the mechanic), a zone identifier of the initiator actor, and a position of the initiator actor.

Another example of an event about the mechanic can indicate that the mechanic had an impact on game play (e.g. an arrow hit a target). Properties of this event include a list (e.g., array) of mechanics which were used (e.g. fire arrow, fire damage) and whether the mechanics were used by or against the video game player. Other properties are possible, such as optionally the initiator actor identifier, the zone identifier of the initiator actor, the position of the initiator actor, a target actor identifier (e.g., an identifier of the actor targeted by the mechanic), a zone identifier of the target, a position of the target actor, and an identifier of a mechanic that mitigates the initiator's mechanic(s).

The video game platform 150 can also collect data about game media in a video game, where this data is reported similarly to the events based on predefinitions in program code of the video game. The game media represents a piece of media (text, audio, video, image) related to the video game, provided by the game developer. The game media may exist in-game (e.g. cut-scene, audio log, book) or may not (e.g. developer commentary). The game media can be defined in the program code as an object with multiple properties. The properties include a game media identifier, a name, a format, a category, an unlock rule, and a uniform resource locator (URL). The game media identifier is a unique identifier of the game media. The name can be a localizable name of the game media. The format can indicate the media format, such as whether the game media is an image, audio, video, text, etc. The category indicates a type of the game media, such as whether the game media is a cut-scene, audio-log, poster, developer commentary, etc. The unlock rule indicates whether the game media should be unlocked for all video game players or based on an activity or a specific game media event. The URL references a server-provisioned media file, where this server can be part of the game developer system 170 or the video game platform 150. Other properties are possible including, for instance, an indication of whether the object should be treated as hidden for spoiler block uses cases (the default may be set to false), an entitlement (e.g., indicating that only video game players who own a particular video game entitlement can unlock the game media), and an activity identifier (e.g., to associate the game media with a particular activity). Multiple events about the game media are possible.

An example of an event about the game media can indicate that a particular piece of game media has been unlocked for the video game player. A property of this event includes the game media identifier.

Another example of an event about the game media can indicate that a particular piece of game media has started in the video game. The game media object should be considered unlocked for the video game player at the corresponding time. A property of this event includes the game media identifier.

Yet another example of an event about the game media can indicate that a particular piece of game media has ended in the video game. A property of this event includes the game media identifier.

Figure 2:
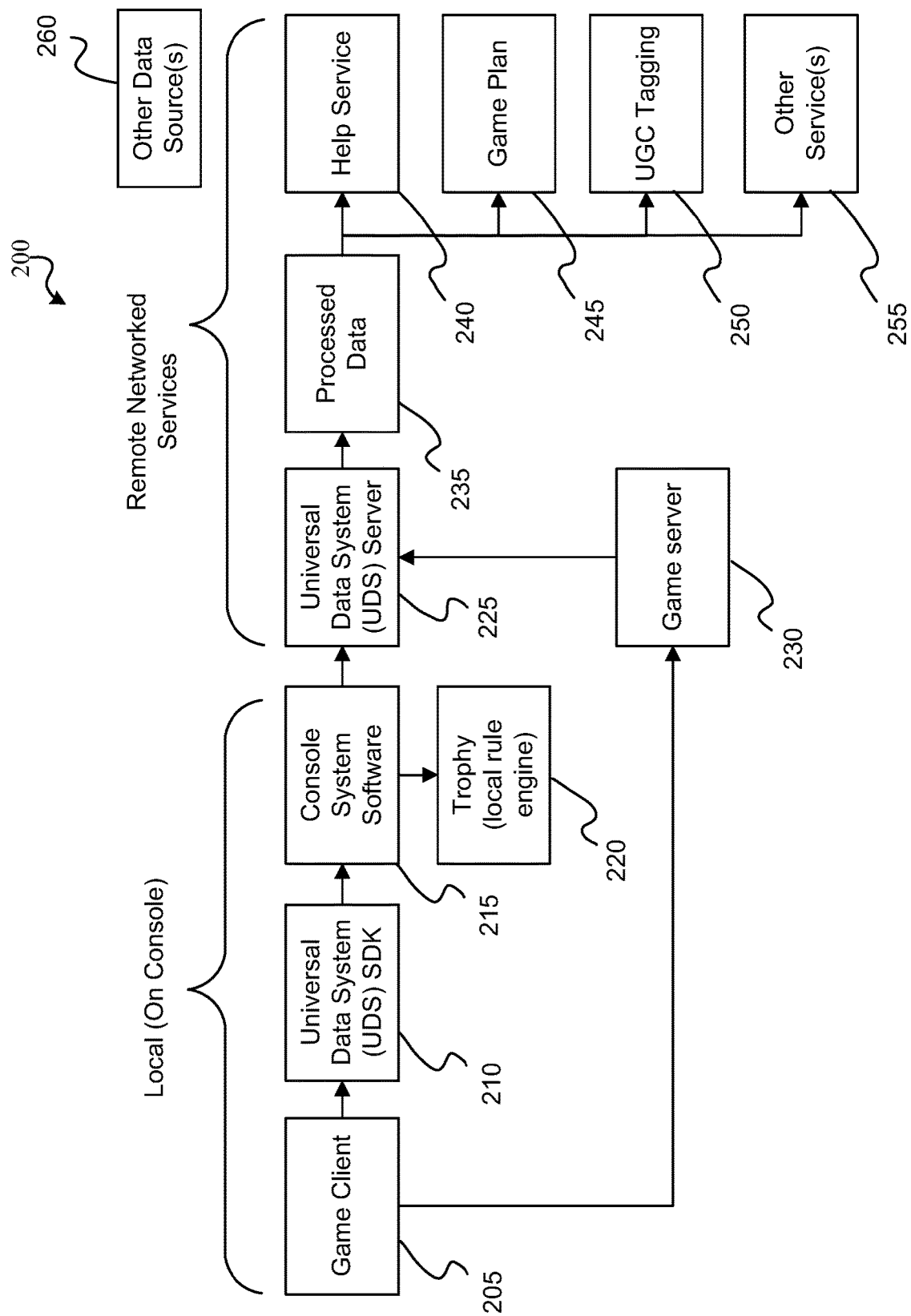
FIG. 2 illustrates an example of a system architecture for providing users with contextual information regarding available game activities, according to embodiments of the present disclosure.

FIG. 2 illustrates an example of a system architecture for providing users with contextual information regarding available game activities, according to embodiments of the present disclosure. In some embodiments, the exemplary system architecture 200 includes a game client 205, a universal data system (UDS) software development kit (SDK) 210, console system software 215, a local rule engine 220, a UDS server 225, a game server 230, processed data 235, and one or more other remote networked services, including a help service 240, game plan 245, user generated content (UGC) tagging 250, and other service(s) 255. The help service 240 may also receive information from other data source(s) 260. Some of the components of the system architecture 200 are examples of components of the video game platform 150 of FIG. 1. For instance, the UDS server 225 and the game server 230 are components of the video game platform 150.

The game client 205 and game server 230 provide contextual information regarding at least one application to a universal data system (UDS) server 225 via a UDS data model describing the logical structure of UDS data used by the UDS SDK 210. The UDS data model enables the platform (e.g., the video game platform 150) to realize remote networked services, such as the help service 240, game plan 245, UGC tagging 250, and other service(s) 255 that require game data, without requiring a game to be patched separately to support a service. The UDS data model assigns contextual information to a portion of information in a unified way across games. The contextual information from the game client 205 and UDS SDK 210 is provided to the UDS server 225 via the console system software 215. It is to be understood that the game client 205, UDS SDK 210, console system software 215, and local rule engine 220 may run on a computer or other suitable hardware for executing at least one application.

The UDS server 225 receives and stores contextual information from the game client 205 and game server 230 from at least one application. To be sure, the UDS server 225 may receive contextual information from a plurality of game clients and game servers for multiple users. The information may be uniformly processed 235 and then received by the plurality of remote networked services 240, 245, 250, and 255.

Figure 3:
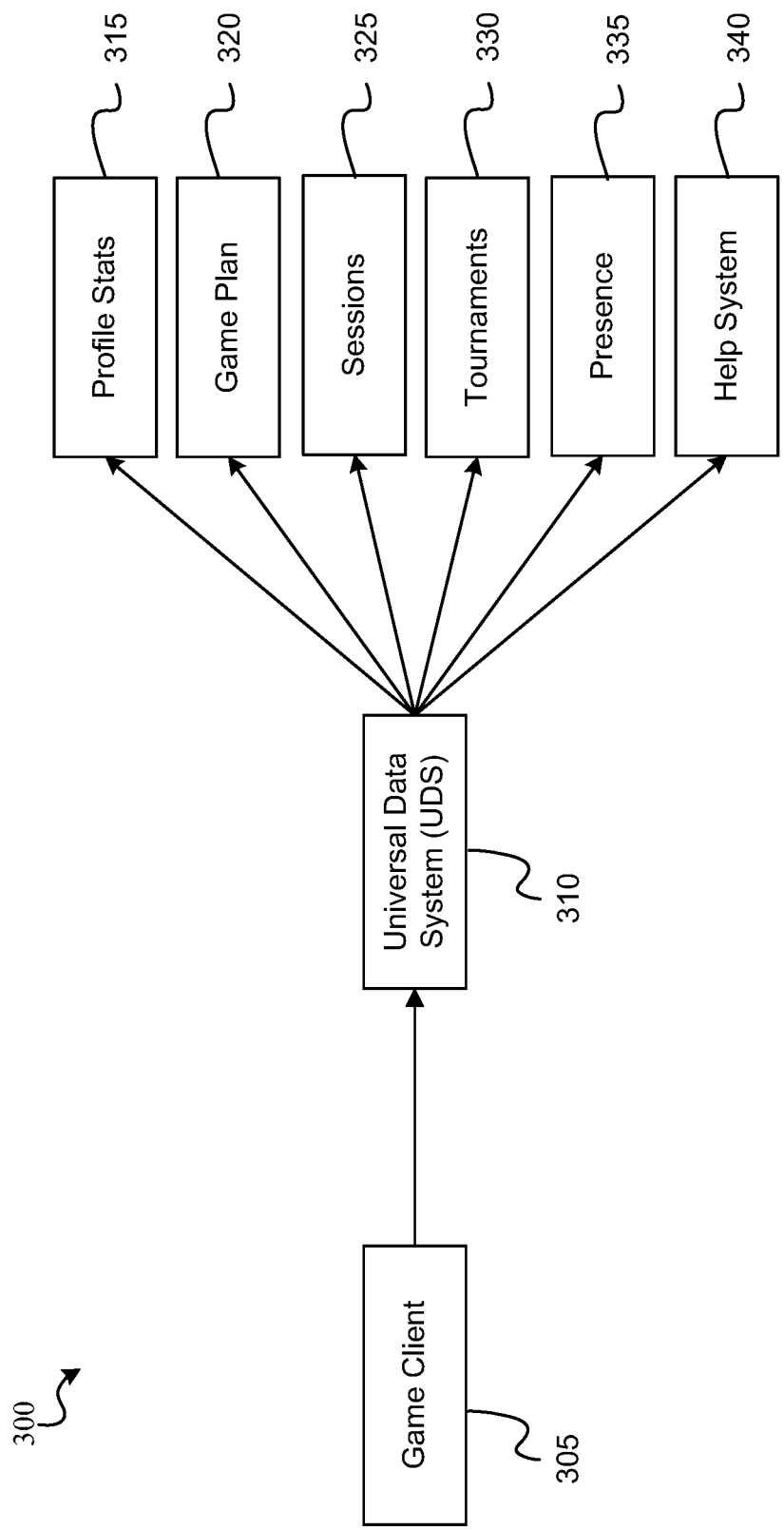
FIG. 3 illustrates another example of a system architecture, according to embodiments of the present disclosure.

FIG. 3 illustrates another example of a system architecture 300, according to embodiments of the present disclosure. A game client 305 sends contextual information to a UDS server 310, which provides the contextual information in a unified data model to a plurality of remote networked services, including profile stats 315, game plan 320, sessions 325, tournaments 330, presence 335, and help system 340.

Figure 4:
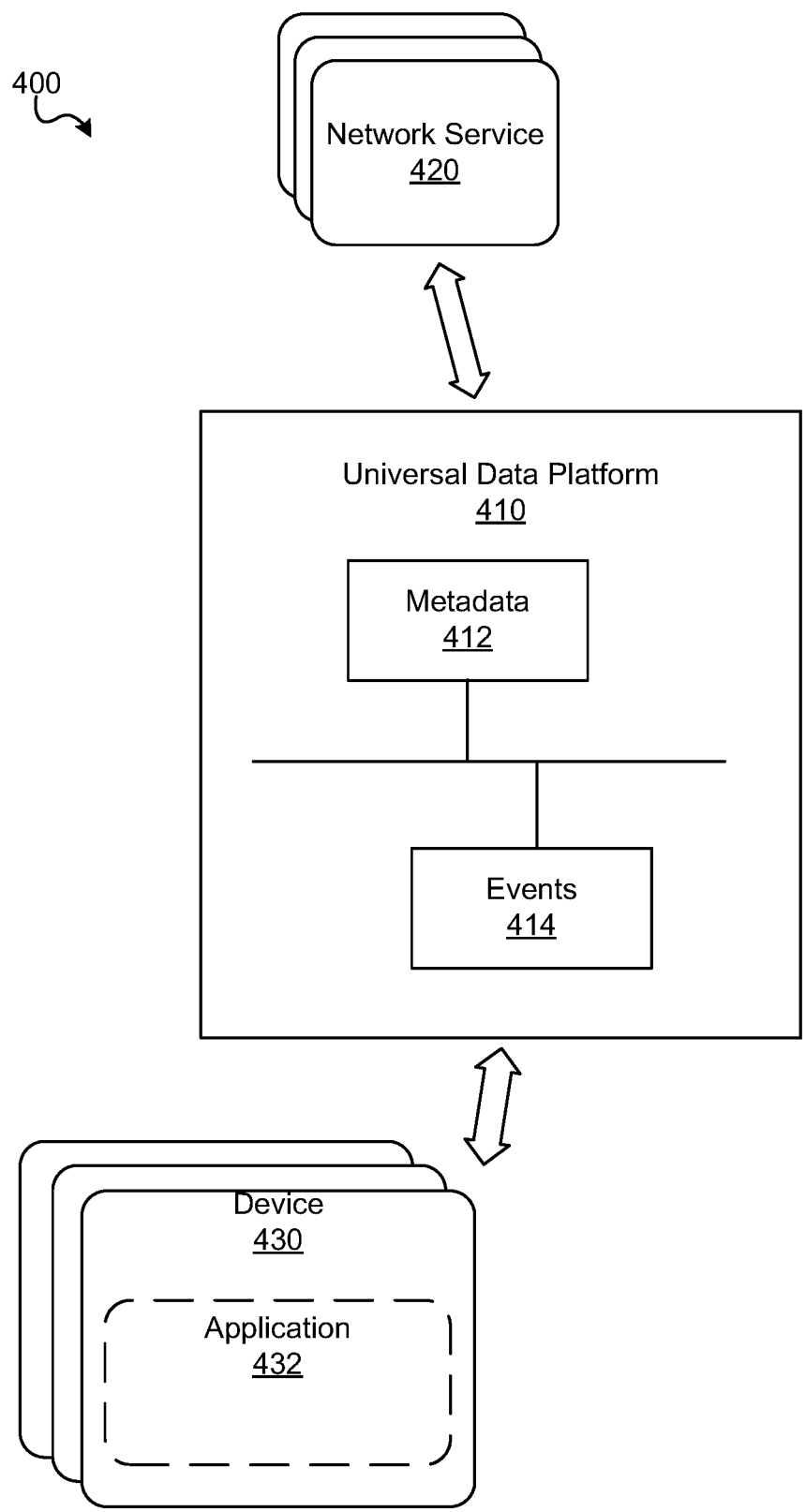
FIG. 4 illustrates an example of a system for providing a data model for a universal data platform, according to embodiments of the present disclosure.

FIG. 4 illustrates an example of a system 400 for providing a data model for a universal data platform 410, according to embodiments of the present disclosure. Some of the components of universal data platform 410 are examples of components of the video game platform 150 of FIG. 1. In one example embodiment, system 400 can include at least one device 430 configured to execute at least one of a plurality of applications 432, each application having an application data structure. The universal data platform 410 can be executed on one or more servers. The universal data platform 410 can include a data model which is uniform across the plurality of application data structures. The data model can include metadata 412 corresponding to at least one object indicated in the data model, and events 414 corresponding to a trigger condition associated with at least one metadata entry. The values of the metadata 412 and events 414 can be associated with a user profile. The universal data platform 410 can be configured to receive application data from the at least one device 430 and store the application data within the data model. The system 400 can also include a plurality of remote networked services 420 configured to access the application data from the universal data platform 410 using the data model.

In various embodiments, the metadata 412 may include: a list of all activities that a user can do in an application, an activity name, a description of the activity, a state of the activity (whether available, started, or completed), whether the activity is required to complete an objective or campaign, a completion reward for the activity, an intro or outro cut-scene, an in-game location, one or more conditions that must be met before the activity becomes available, and a parent activity that contains the activity as a sub-activity. Metadata 412 may further include: a list of abilities exercisable by the user, effects of each action, telemetry indicative of when actions and effects take place including corresponding timestamps and locations, an in-game coordinate system, a list of in-game branch situations, and telemetry indicative of when a branch situation is encountered and which option is selected by the user. A list of in-game statistics, items, lore, in-game zones and corresponding attributes regarding each statistic, item, lore, or zone may likewise be included in the metadata 412. In addition, the metadata 412 may indicate whether or not a particular activity, entity (such as a character, item, ability, etc.), setting, outcome, action, effect, location, or attribute should be marked as hidden.

Events 414 may be fired in response to several various trigger conditions. For example, such trigger conditions may include: an activity that was previously unavailable becomes available, a user starts an activity, a user ends an activity, an opening or ending cut-scene for an activity begins or ends, the user's in-game location or zone changes, an in-game statistic changes, an item or lore is acquired, an action is performed, an effect occurs, the user interacts with a character, item, or other in-game entity, and an activity, entity, setting, outcome, action, effect, location, or attribute is discovered. The events 414 may include further information regarding a state of the application when the events 414 were triggered, for example a timestamp, a difficulty setting and character statistics at the time a user starts or ends an activity, success or failure of an activity, or a score or duration of time associated with a completed activity. It is to be understood that metadata 412 and events 414 may include any and all contextual information related to activities described in the present disclosure.

Figure 5:
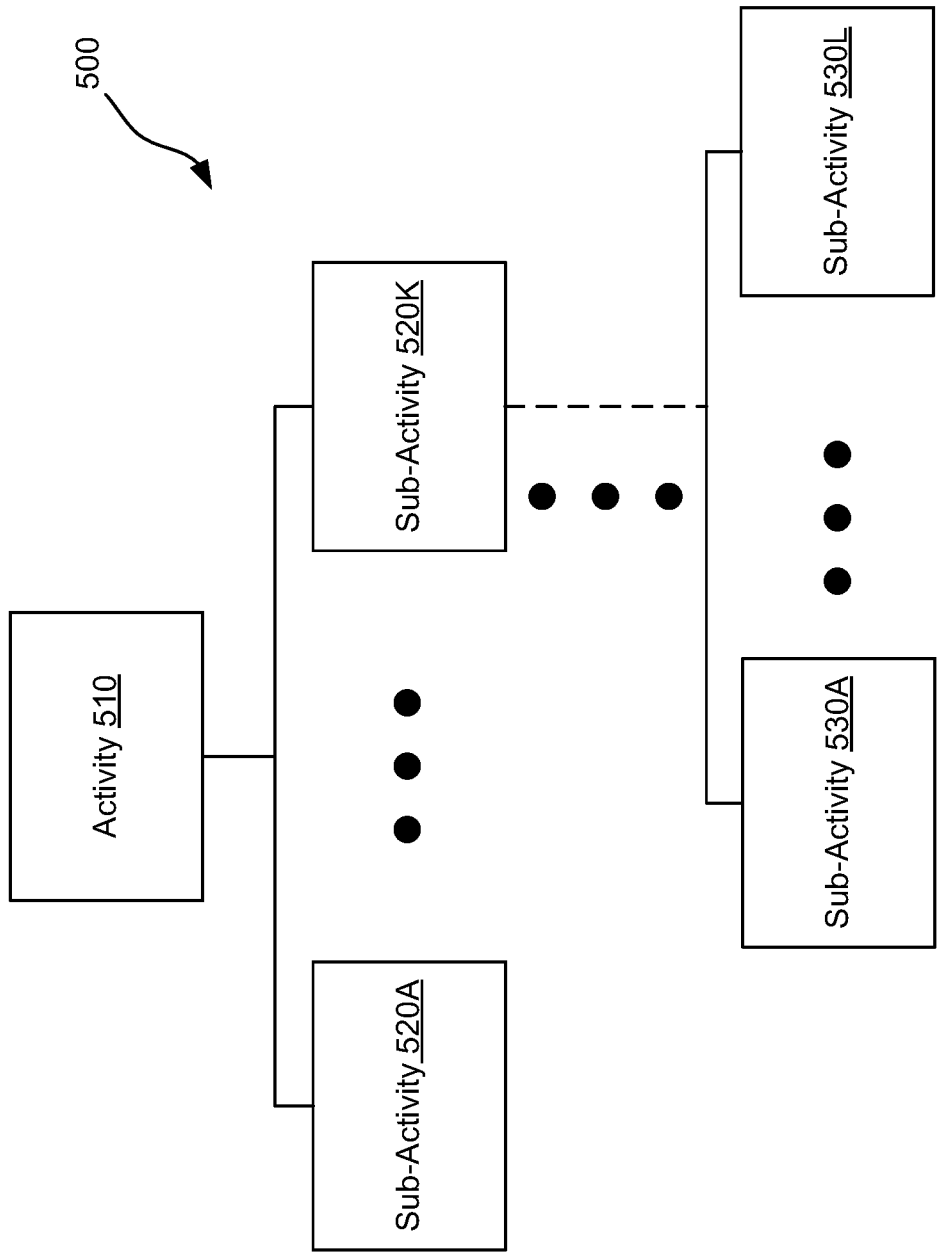
FIG. 5 illustrates an example of an activity hierarchy, according to embodiments of the present disclosure.

FIG. 5 illustrates an example of an activity hierarchy, according to embodiments of the present disclosure. As illustrated, an activity 510 can include multiple nested tasks, referred to herein as sub-activities, forming a hierarchy 500. The activity 510 can be a node on top of the hierarchy 500 (e.g., a root node) and can have a set of child sub-activities 520A-520K at the next level of the hierarchy 500. In turn each ones of the sub-activities 520A-520K may be a child node of the activity 510 and, possible, a parent node to a set of sub-activities at the next hierarchy level. For instance, the sub-activity 520K is a parent node to a set of sub-activities 530A-530L. This type of association between nodes, each representing a sub-activity, can be repeated at the different levels of the hierarchy 500. A set of mechanics can be associated with each node indicating that such mechanic(s) can be available or usable in the activity corresponding to the node.

As explained herein above, the activity 510 has an activity identifier. Each sub-activity also represents an activity and, thus, has an activity identifier too. Likewise, each of the mechanics has a mechanic identifier. Associations between the activity identifiers themselves and between the activity identifiers and the mechanic identifiers can be defined based on the hierarchy 500. Such associations can be stored in objects that define the activities (or sub-activities) and/or that define the mechanics and/or can be stored in events that relate to such objects. For instance, the activity identifier of the sub-activity 520K can be associated with the activity identifier of the activity 510 and/or the activity identifiers of the sub-activities 530A-530L. Similarly, the activity identifier of the sub-activity 530L can be associated with the activity identifier of the sub-activity 520L and/or the mechanic identifiers of the mechanics 540A-540M. Further, a mechanic identifier of a mechanic can be associated with an activity identifier.

Figure 6:
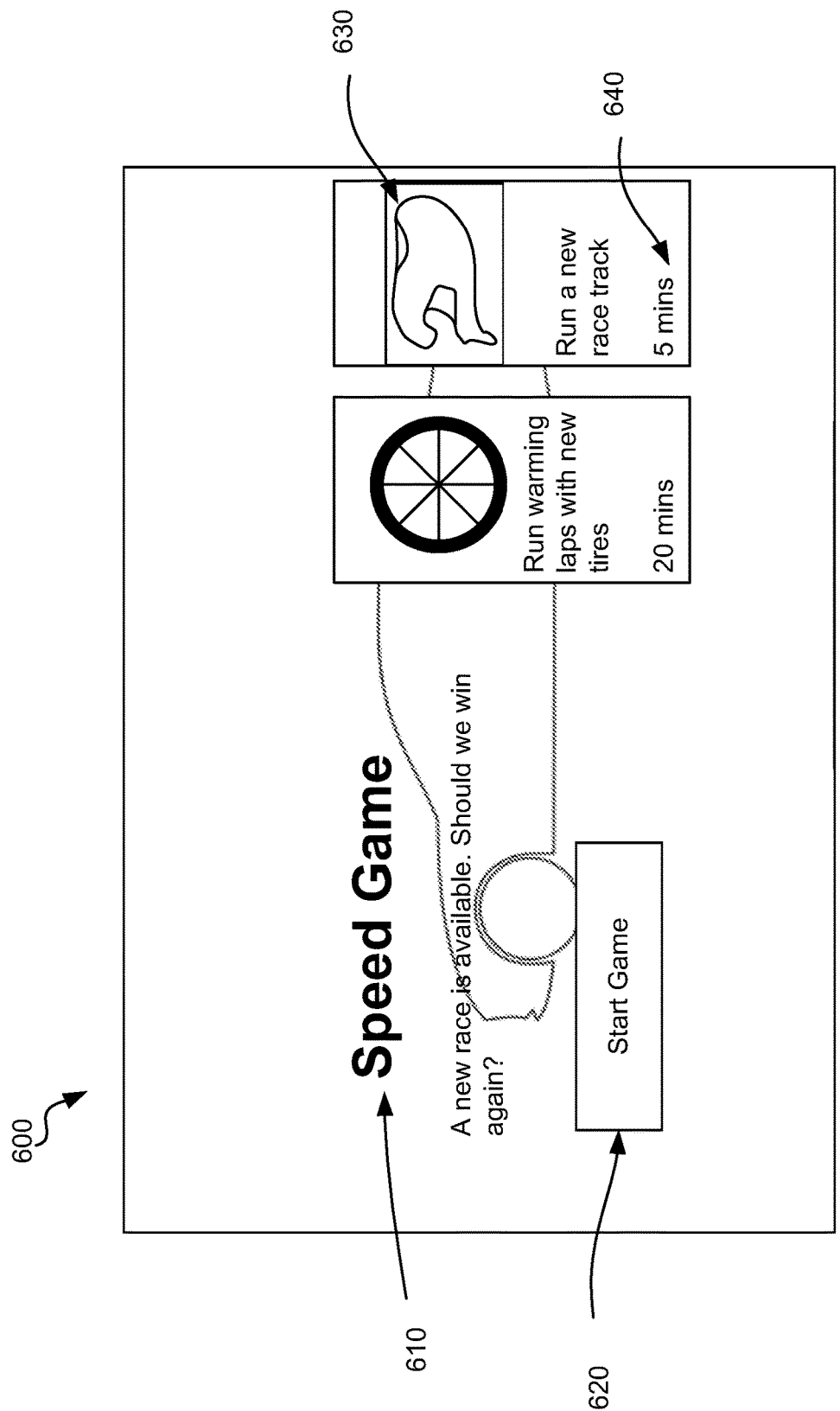
FIG. 6 illustrates an example of a user interface for presenting information about a suggested activity, according to embodiments of the present disclosure.

FIG. 6 illustrates an example of a user interface for presenting information about a suggested activity, according to embodiments of the present disclosure. In particular, a video game console (e.g., the video game console 110 of FIG. 1) presents video game-related functionalities to a user of a video game (e.g., the user 112 of FIG. 1). In addition to enabling game play, the game-related functionalities present information indicating that an activity is suggested. User input can be received to launch the activity following the presentation of the information.

As illustrated in FIG. 6, the video game console presents a user interface 600 on a display (e.g., the display 120 of FIG. 1). The user interface 600 includes a video game page that shows various information and functionalities that relate to a video game. In an example, a short description 610 of the video game is presented (e.g., game title, the developer, an edition of the video game). A selectable option 620 to start the video game is also presented. Other information and functionalities are also possible.

In addition, a set of activity suggestions 630 is presented. Each one of the activity suggestions 630 can be presented in a window, an icon, an overlay, or any other GUI element within the user interface 600. The GUI element of an activity suggestion can embed different information related to an activity in the video game, such as a selectable link to launch the activity and/or a selectable link to view a completion of the activity in the video game. The activity suggestion can identify the activity in the video game, where the activity is available to the user and not previously attempted or completed by the user. For instance, the activity suggestion includes a textual description, an image of the activity, and/or embedded link(s), where such data is available from the object that defines the activity. Further, the activity suggestion includes an estimated completion time 640 for the activity (e.g., shown as twenty minutes for the first suggested activity about running warming laps with new tires and as five minutes for the second suggested activity about running a new race track).

Each of the activity suggestions 630 can be associated with a readiness score. A video game platform (e.g., the video game platform 150 of FIG. 1) can generate the readiness score based on event data (e.g., the event data 114 and 132 of FIG. 1) and a set of sort factors. The video game platform can send information about each of the activities to the video game console. In turn, the video game console presents the information as the activity suggestions 630.

A user selection of a suggested activity can trigger the video game console to launch the activity (e.g., locally or remotely based on an instance of the video game on the video game platform). Video game content related to the activity can be presented in the user interface 600.

Figure 7:
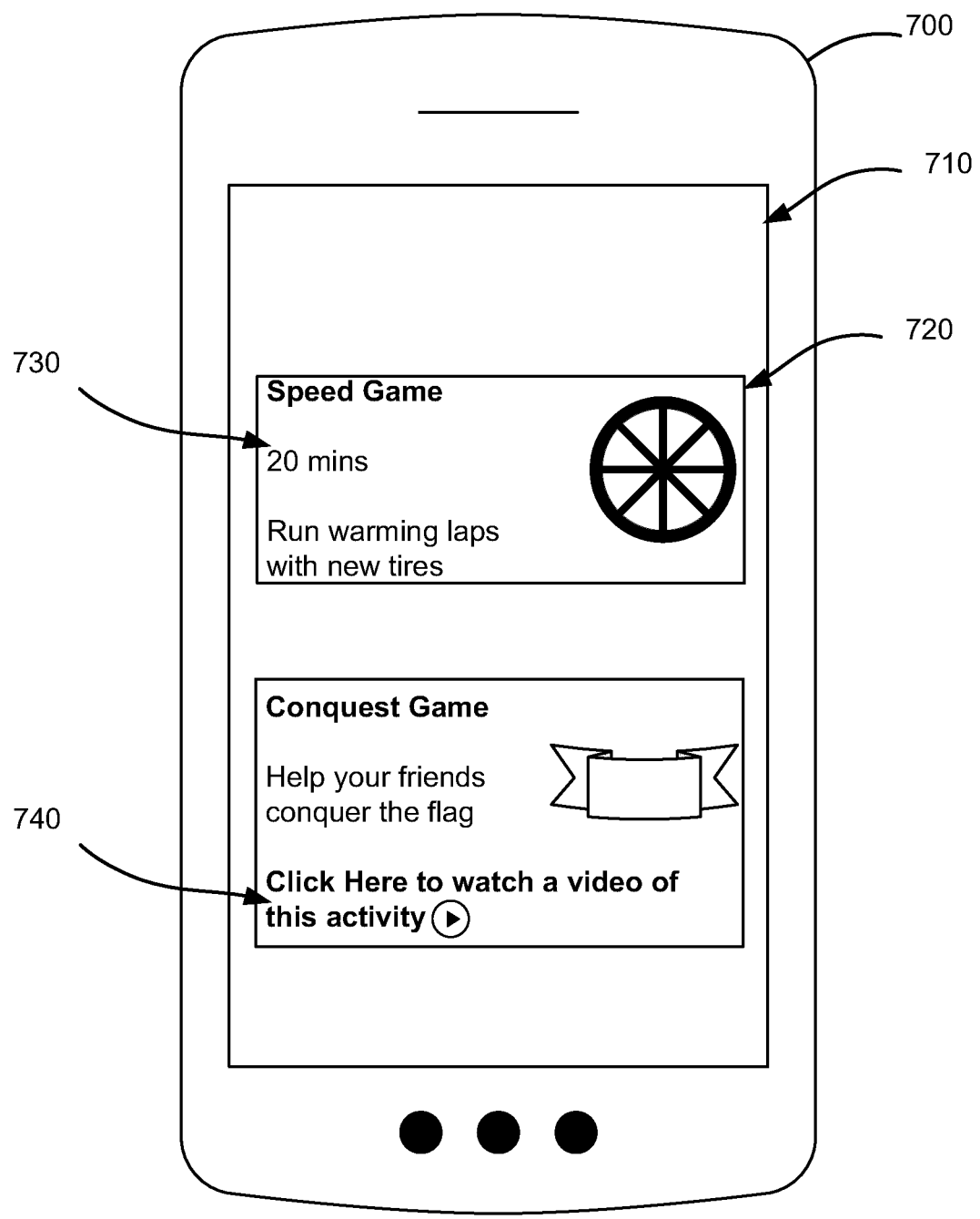
FIG. 7 illustrates another example of a user interface for presenting information about a suggested activity, according to embodiments of the present disclosure.

FIG. 7 illustrates another example of a user interface for presenting information about a suggested activity, according to embodiments of the present disclosure. Here, a user device 700, other than a video game console, such as a smart phone, can execute an application that provides access to functionalities from a video game platform (e.g., the video game platform 150 of FIG. 1) via a user interface 710 of the user device 700. The functionalities include receiving, via a pull mechanism or a push mechanism, activity suggestions 730 for presentation in the user interface 710. The activity suggestions 730 can relate to activities in different video games (or even different types of applications, such as video streaming application, music streaming application, social media application, etc.), where each of such activities is available to the user and not previously attempted or completed by the user. For instance, each activity suggestion identifies the respective video game and includes a textual description and an image of the activity, where such data is available from the object that defines the activity. In addition, some of or each activity suggestion includes an estimated completion time 730 for the activity (e.g., shown as twenty minutes for the first suggested activity about running warming laps with new tires in the speed game and as forty-five minutes for the second suggested activity about helping a friend conquer a flag in a conquest game).

A user selection of a suggested activity can trigger the user device 700 to queue in a user account of the user (e.g., download the activity, add the activity to a list of activities to be performed, etc.) such that the activity can be subsequently launched for the user. Alternatively or additionally, the user selection can trigger the user device 700 and/or a video game console associated with the user account to launch the activity (e.g., locally or remotely based on an instance of the video game on the video game platform).

Further, some of or each activity suggestion includes a selectable link 740 to view a completion of the corresponding activity. For instance, video file about completing the activity can be available from a video game developer of the video game and/or from a video game player that completed the activity and recorded their game play. Such video file(s) can be defined as an object(s) for a game media, as described in connection with FIG. 1. If multiple video files are available for the same activity, these videos can be ranked based on their time length, storage size, video quality, feedback about them from other video game players, mechanics that they show (relative to mechanics available to the user), statistics of the video game players that recorded them (relative to statistics of the user), and other factors.

A user selection of the selectable link 740 can trigger a download of the corresponding video file to local storage and a presentation from the local storage. Alternatively, the video file can be streamed from the content source without being downloaded locally to the user device or the video 700 or the video game console.

Figure 8:
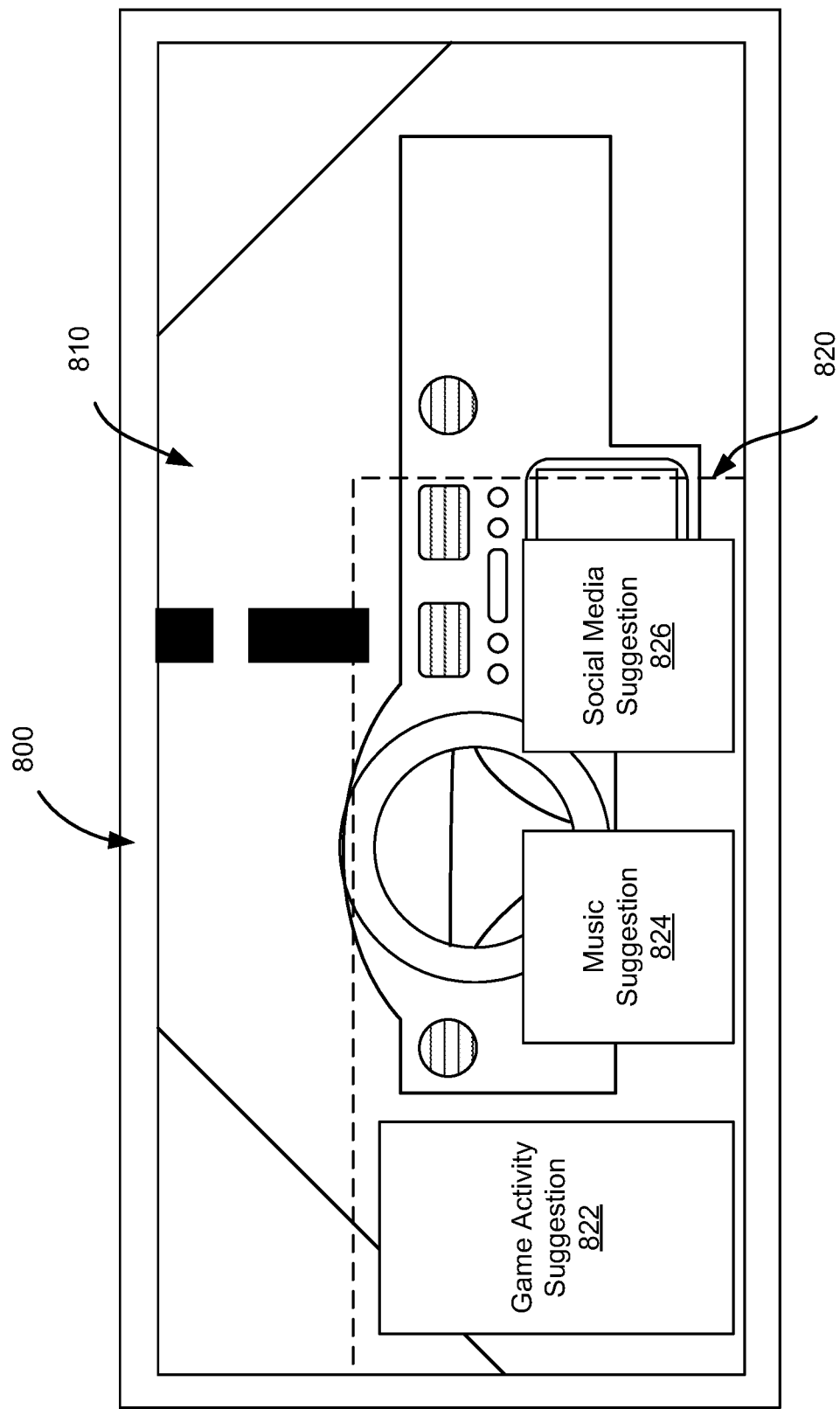
FIG. 8 illustrates yet another example of a user interface for presenting information about a suggested activity, according to embodiments of the present disclosure.

FIG. 8 illustrates yet another example of a user interface for presenting information about a suggested activity, according to embodiments of the present disclosure. In particular, a video game console (e.g., the video game console 110 of FIG. 1) presents various functionalities to a user (e.g., the user 112 of FIG. 1), where the functionalities correspond to different applications executing locally on the video game console, remotely on a video game platform (e.g., the video game platform 150 of FIG. 1), or distributed between the video game console and the video game platform. These functionalities can relate to any of video games, video streaming, audio streaming, social media communications, application and/or title downloads, application and/or title installations, and/or other available applications.

As illustrated in FIG. 8, the video game console presents a user interface 800 on a display (e.g., the display 120 of FIG. 1). The user interface 800 includes content 810 corresponding to an application that is being executed (e.g., the content 810 can be video game content when the application is a video game, as illustrated in FIG. 8; the content 810 can be social media content when the application is a social media application, and so on and so forth). Based on user input at an input device (e.g., a selection of particular buttons on a video game joystick, a user utterance received by an audio sensor, a user gesture detected by an optical sensor, etc.), a menu 820 is presented in the user interface 800. The presentation can include an overlay of the menu 820 over at least a portion of the content 810, while the application continues to be executed.

The menu 820 can include multiple activity suggestions. These activity suggestions may relate to activities in a same video game, in different video games, in the application being executed, and/or in one or more other applications available locally at the video game console, remotely from the video game platform, and/or distributed between the video game console and the video game platform. As illustrated, the menu 820 presents a game activity suggestion 822, a music suggestion 824, and a social media suggestion 826. The game activity suggestion 822 corresponds to an activity in a video game, whereas the music suggestion 824 and the social media suggestion 826 correspond to an activity in a music application and an activity in a social media application, respectively.

A user selection of any of the suggested activities presented in the menu 820 can received. The corresponding activity can be launched. The content related to executing the activity can be presented in the user interface 800 in a window overlay over the content 810, in a window adjacent to the content 810, or in a replacement of the content 810.

Figure 9:
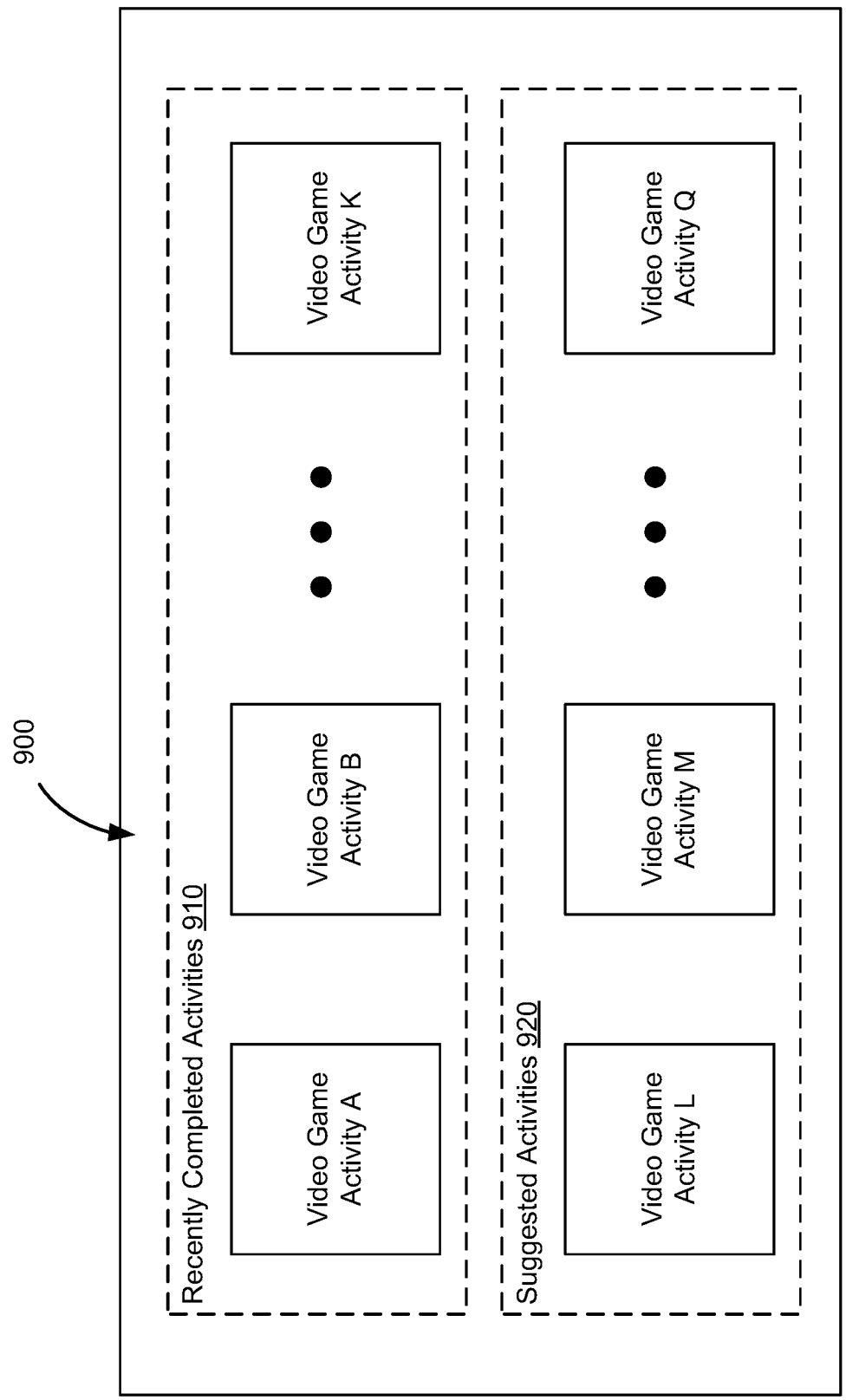
FIG. 9 illustrates a further example of a user interface for presenting information about a suggested activity, according to embodiments of the present disclosure.

FIG. 9 illustrates a further example of a user interface for presenting information about a suggested activity, according to embodiments of the present disclosure. In particular, a video game console (e.g., the video game console 110 of FIG. 1) presents functionalities to a user (e.g., the user 112 of FIG. 1), where the functionalities relate to one or more video games. More specifically, the functionalities present information about activities associated with one or more video games available to the user.

As illustrated in FIG. 9, the video game console presents a user interface 900 on a display (e.g., the display 120 of FIG. 1). The user interface 900 includes a recently completed activities section 910 and a suggested activities 920 section.

The recently completed activities section 910 identifies activities in the one or more video games that have been completed by the user. For instance, each identifier can be presented in a window, an icon, an overlay, or any other GUI element within the recently completed activities section 910. The GUI element of a completed activity can embed different information related to the completed activity, such as a selectable link to re-launch the activity. The GUI element can also include a textual description, an image of the activity, and/or other information about the activity available from the object that defines the activity.

The suggested activities 920 section 910 identifies activities in the one or more video games that have been not completed by the user but are suggested to the user. For instance, each identifier can be presented in a window, an icon, an overlay, or any other GUI element within the suggested activities 920 section. The GUI element of a suggested activity can embed different information related to the completed activity, such as a selectable link to launch the activity and/or embedded link(s), where such data is available from the object that defines the activity. The GUI element can also include a textual description, an image of the suggested activity, and/or other information about the suggested activity available from the object that defines the suggested activity.

Figure 10:
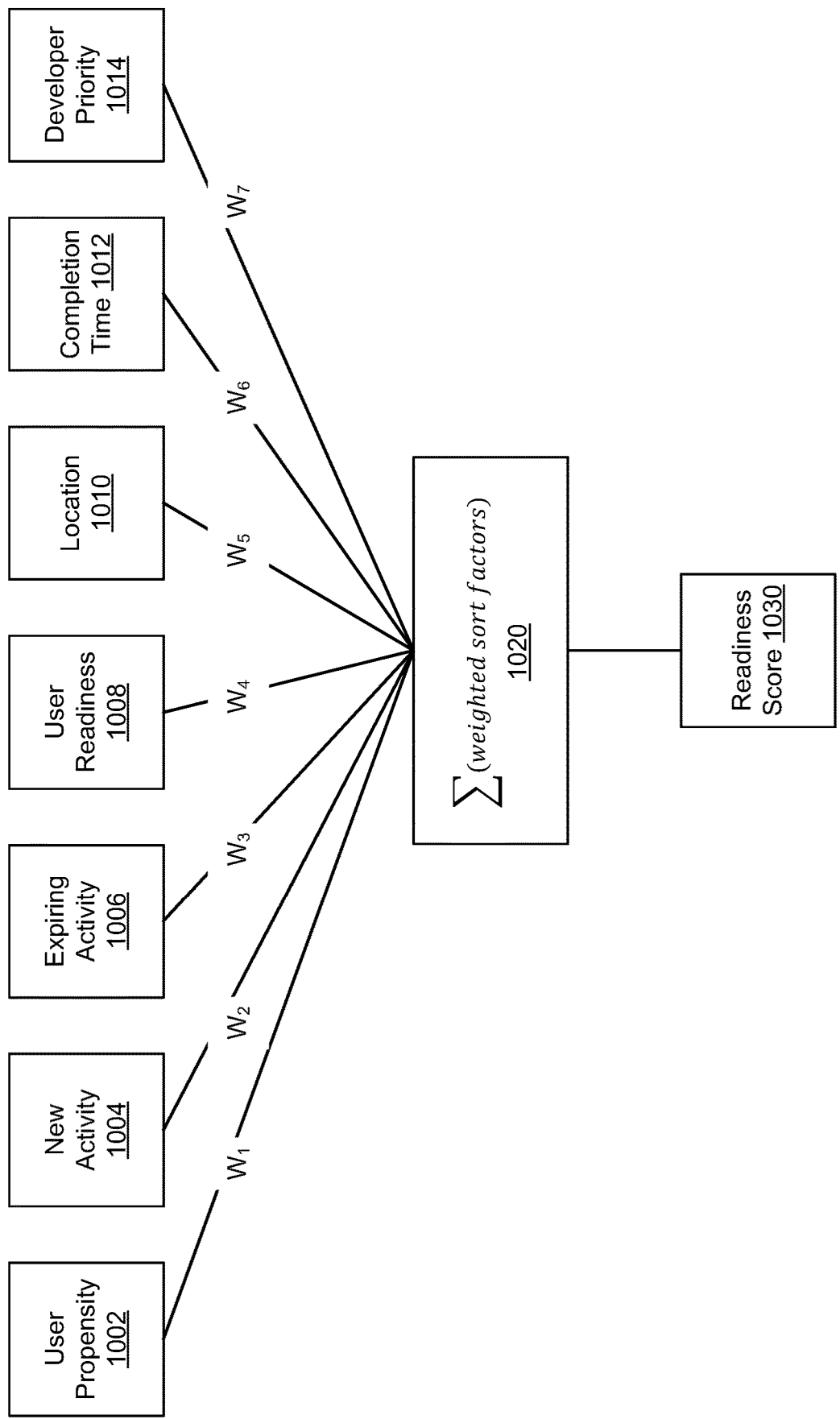
FIG. 10 illustrates an example of ranking of activities, according to embodiments of the present disclosure.

FIG. 10 illustrates an example of ranking of activities, according to embodiments of the present disclosure. In particular, a video game platform (e.g., the video game platform 150 of FIG. 1) processes event data stored in a data store (e.g., the event data 154 stored in the data store 152 of FIG. 1) to determine activities not completed by a user, rank the activities, and present activity suggestions based on the ranking.

In an example, an activity is identified as a candidate activity for the readiness score and ranking upon a determination that the user has not performed this activity. For instance, the video game platform can determine, from the data store, activity identifiers that are associated with a user identifier of the user (e.g., thereby identifying the activities that the user has played) and determine that these activity identifiers exclude the identifier of the activity (e.g., thereby identifying that the activity has not been played by the user yet). In addition, the video game platform determines whether this activity includes any spoiler to the user (e.g., based on the event data as described in connection with spoiler blocks in FIG. 1). If no spoiler is included and if the activity identifier does not correspond to any of the activities performed by the user, the activity can be set as a candidate activity.

Each of the candidate activities can be ranked according to a set of sort factors. These factors relate to other video game players, the user, context(s) of the other video game players and/or the user in an application (e.g., a video game application), and/or context(s) of the other video game players and/or the user on the video game platform. The ranking can involve generating a readiness score per candidate activity given how the sort factors are met and sorting the candidate activities based on their readiness scores.

The highest ranked candidate activities (e.g., the top three, or some other number) can be identified to the user. In particular, activity suggestions corresponding to these activities are sent to one or more computing devices of the user and presented thereat, as illustrated in connection with FIGS. 6-9.

As illustrated in FIG. 10, the sort factors include user propensity 1002, new activity 1004, expiring activity 1006, user readiness 1008, location 1010, completion time 1012, and developer priority 1014. Each of these factors is described herein next. Of course, not all of the sort factors may be used. In addition, other sort factors related to generating suggestions based on event data can be defined and used.

In an example, the user propensity 1002 is a sort factor indicating a likelihood of the user selecting a candidate activity if suggested. Event data stored for the candidate activity and corresponding to events collected for a plurality of video game players includes the activity identifier and the activity type of the candidate activity (e.g., progress, competitive, challenge, and/or open ended) and mechanic identifiers of mechanics used in the candidate activity. An individual score for the user propensity 1002 (referred to herein as a propensity score) can be generated based on the event data and a game play history of the user. For instance, the game play history of the user can be statistically be analyzed to determine a statistical measurement (e.g., a frequency) of the user performing activities based on their activity types. The propensity score can be set as a function (e.g., proportional or inverse proportional) of the statistical measurement that corresponds to the activity type of the candidate activity. In another illustration, the game play history of the user can be statistically be analyzed to determine a statistical measurement of the user selecting suggested activities based on their activity types. The propensity score can be set as a function of the statistical measurement that corresponds to the activity type of the candidate activity. In another illustration, the event data indicates that the mechanic is frequently used to complete the candidate activity. The game play history of the user can be statistically be analyzed to determine a statistical measurement of the user using the mechanic to complete other activities. The propensity score can be set as a function of the statistical measurement.

In an example, the new activity 1004 is a sort factor indicating how recent the candidate activity is. The recency can be defined relative to a first availability date (e.g., the first time the candidate activity became available in a video game (e.g., to all video game players) and/or to the first time the candidate activity became available to the user (e.g., unlocked)). A property of an object defining the candidate activity and/or the game play history of the user can indicate the recency. An individual score for the new activity 1004 (referred to herein as a recency score) can be generated as a function (e.g., a decay function) of the first availability date. For instance, the more recent the candidate activity is, the higher the recency score is.

In an example, the expiring activity 1006 is a sort factor indicating an expiration time of the candidate activity. The expiration time can be defined relative to when the candidate activity will no longer be available in a video game (e.g., to all video game players) and/or to when the candidate activity will no longer be available to the user (e.g., locked or removed). A property of an object defining the candidate activity can indicate the expiration time. An individual score for the expiring activity 1006 (referred to herein as an expiration score) can be generated as a function (e.g., an inverse of a decay function) of the expiration time. For instance, the closer the expiration time is, the higher the expiration score is.

In an example, the user readiness 1008 is a sort factor indicating a likelihood of the user to complete the candidate activity. Event data stored for the candidate activity and corresponding to events collected for a plurality of video game players includes mechanic identifiers of mechanics used in the candidate activity and, possibly, outcomes of the candidate activity when the mechanics were used (e.g., success, failures, etc.) and/or the impacts of using the mechanics. An individual score for the user readiness 1008 (referred to herein as a mechanic/in-game characteristic score) can be generated based on the event data, a user profile of the user, game play histories of the video game players that performed the candidate activity, and/or a game play history of the user. For instance, the event data indicates that a particular mechanic is frequently used to complete the candidate activity and, possibly, a successful outcome of the candidate activity and/or a positive impact of the mechanic in the candidate activity. The user profile can be looked up to determine if the mechanic is available to the user (e.g., is in the user's inventory of mechanics or can be added to this inventory). If so, the mechanic/in-game characteristic score can be increased. Further, the game play history of the user can be statistically be analyzed to determine a statistical measurement of the user using the mechanic to complete other activities. The mechanic/in-game characteristic score can be adjusted as a function of the statistical measurement. In yet, another illustration, the mechanics may not be considered. Instead, in-game characteristics impact the mechanic/in-game characteristic score. In particular, user profiles of the video game players and/or their game play histories can be statistically analyzed to determine a set of in-game characteristics of the video game players when the candidate activity was performed (e.g., whether the video game players were at an expert level, beginner level, or any other level; skills of the video game players; trophies of the video game players; scores of the video game players). Similarly, the user profile of the user and/or the user's game play history can be statistically analyzed to determine the most up-to-date set of in-game characteristics of the user. The mechanic/in-game characteristic score can be set a function of the matches between the set of in-game characteristics of the video game players and the set of in-game characteristics of the user. The larger the number of existing matches exists, the higher the mechanic/in-game characteristic score is. In yet another illustration, the mechanic matches and the in-game characteristic matches can be used in conjunction. For instance, each match type can be used to generate an individual score. And the two individual scores can be weighted to generate the mechanic/in-game characteristic score as a weighted sum of the individual scores. The weights can be pre-defined (e.g., as a user setting), can be dynamically updated (e.g., if the user has an expert level, the weight for the mechanic matches can be decreased and the weight for the in-game characteristic matches can be increased; conversely, if the user has a beginner level, the weight for the mechanic matches can be increased and the weight for the in-game characteristic matches can be decreased).

In an example, the location 1010 is a sort factor indicating an in-game location of the user (e.g., a virtual location of the user's virtual player within the virtual world of the video game) relative to a location of the candidate activity in the video game. Event data stored for the candidate activity and corresponding to events collected for a plurality of video game players includes zone identifiers of a zone within the virtual world where the video game players performed the candidate activity and, possibly, positions of the video game players within the zone. An individual score for the location 1010 (referred to herein as a location score) can be generated based on the event data and the in-game location of the user. For instance, the closer the in-game location of the user is to the zone, the higher the location score is. In another illustration, the closer the in-game location of the user is to an average position where the candidate activity was performed, the higher the location score is.

In an example, the completion time 1012 is a sort factor indicating an estimate of the time length likely needed by the user to perform the candidate activity. Event data stored for the candidate activity and corresponding to events collected for a plurality of video game players includes an activity identifier of the candidate activity, starts and ends (including timing) of the candidate activity and, possibly, outcomes of the candidate activity (e.g., success, failure). An individual score for completion time 1012 (referred to herein as a playtime length score) can be generated based on the event data. In particular, the event data can be statistically analyzed to generate a statistical measurement (e.g., an average) of the time length. Further, the statistical measurement can be adjusted to the in-game characteristics of the user (e.g., can be decreased for an expert level user or can be increased for a beginner level user). In addition, an upper and lower bounds can be defined to indicate an acceptable range for the time length. If the time length is smaller than the lower bound, the candidate activity may be too short to suggest. Conversely, if the time length is greater than the upper bound, the candidate activity may be too long to suggest. If the time length is in between the two bounds, the candidate activity may be suggested. If so, the playtime length score can be set as a function (e.g., inverse proportional) of the time length.

In an example, the developer priority 1014 is a sort factor indicating a priority set by a video game developer for the candidate activity. The priority can be set as a property of an object defined for the candidate activity. An individual score for priority 1014 (referred to herein as a priority score) can be generated as a function (e.g., proportional to) the priority.

Each of the propensity score, recency score, expiration score, mechanic/in-game characteristic score, location score, playtime length score, and priority score can be associated with a weight (illustrated in FIG. 10 as weights W, where "i" is between "1" and "7"). The weights can be predefined (e.g., based on a user setting such that the weights are personalized to the user; based on input of the video game developer) or set to default values. Over time, the selection of activity suggestions by the user can be monitored and the weights can be adjusted based on a history of such selections. For instance, if the selection history indicates that the user frequently selects recently available activities while also the user a high mechanic/in-game characteristic score relative to these activities, the weights for the new activity 1004 and user readiness 1008 sort factors can be increased, whereas the remaining weights can be decreased.

A weighted sum 1020 of the individual scores of the sort factors can be computed, resulting in a total score. The total score can be set as a readiness score 1030. The readiness score 1030 can then be used to rank the candidate activity relative to other candidate activities.

Figure 11:
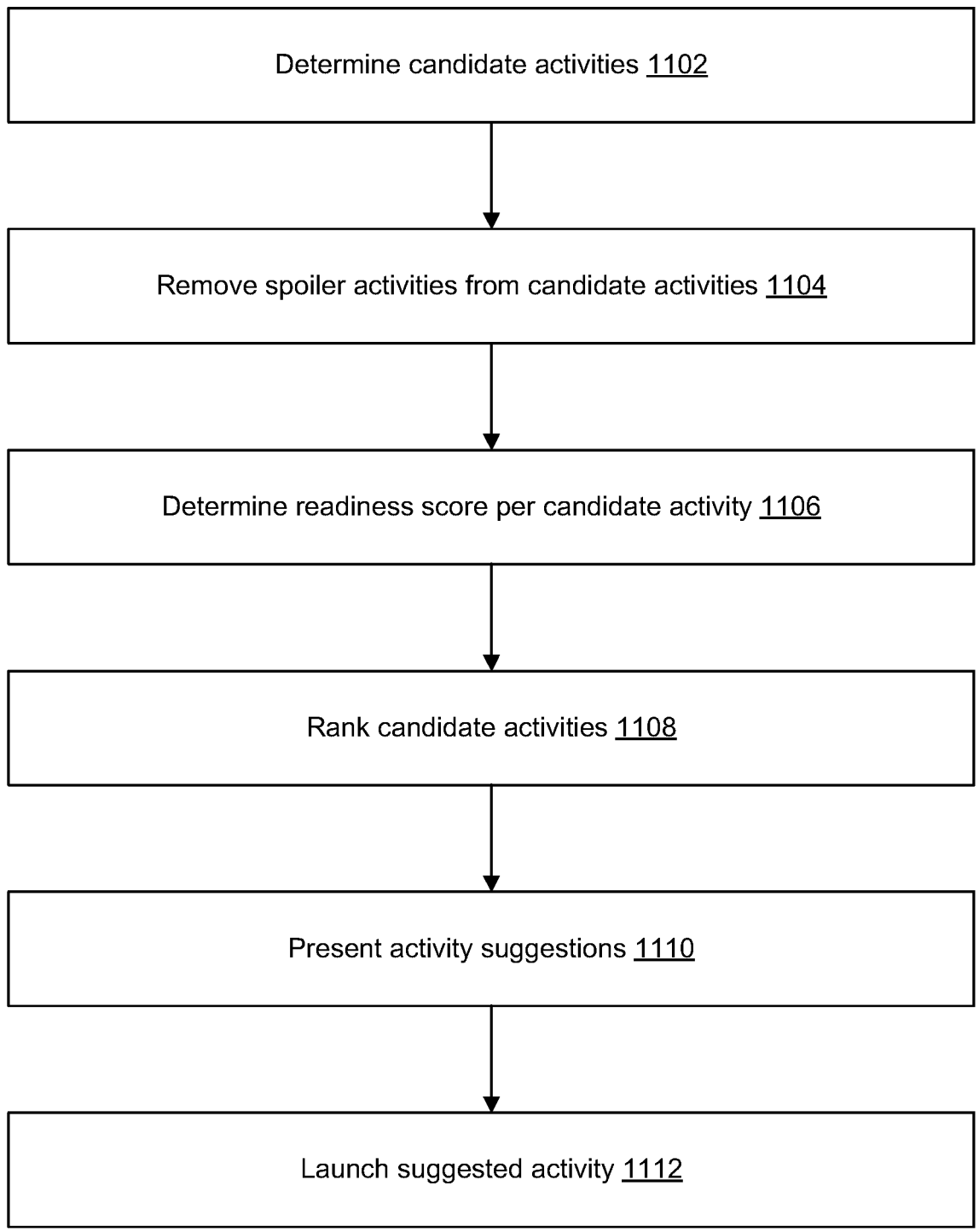
FIG. 11 illustrates an example of a flow for suggesting an activity, according to embodiments of the present disclosure.
Figure 12:
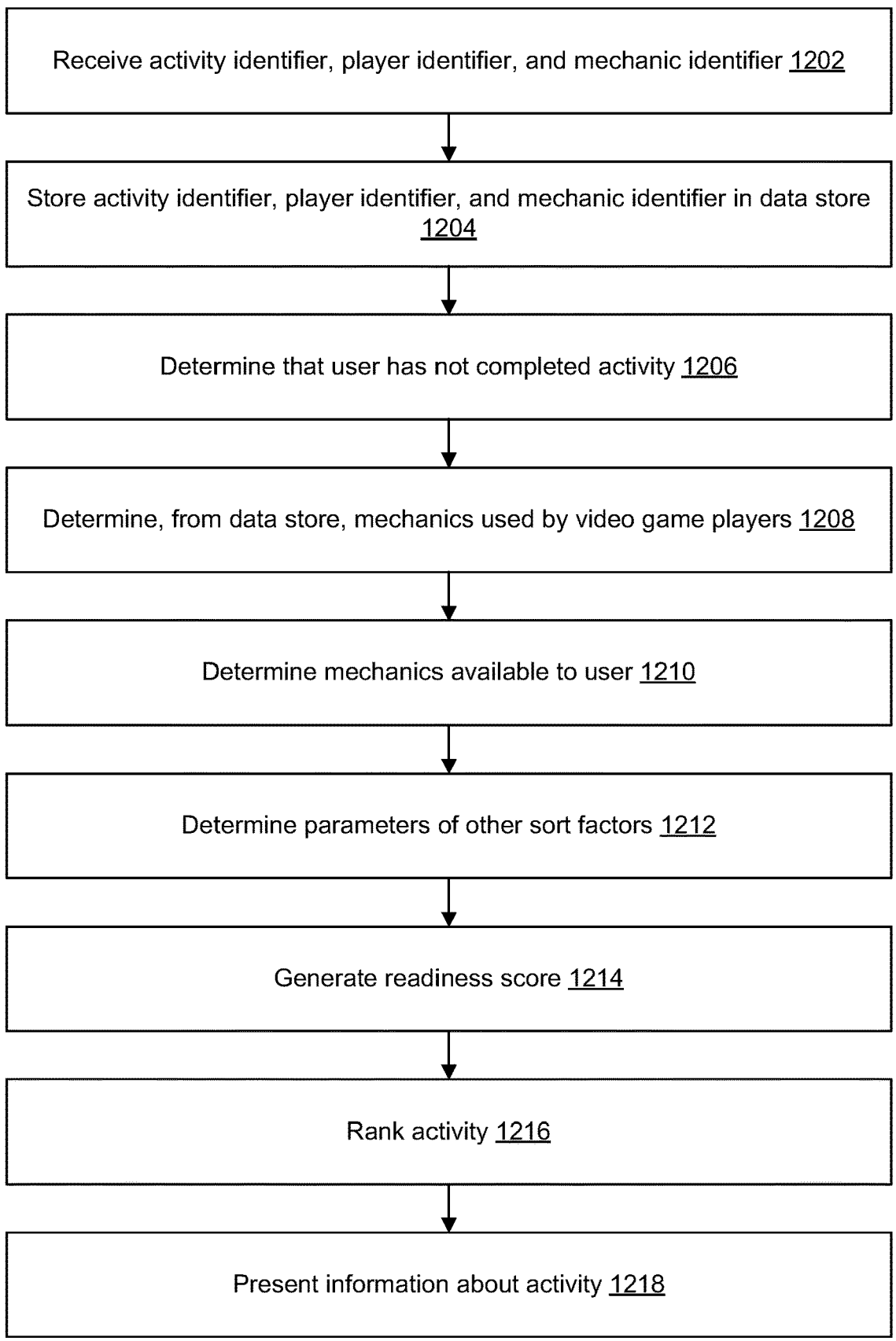
FIG. 12 illustrates another example of a flow for suggesting an activity based on sort factors that include mechanics, according to embodiments of the present disclosure.
Figure 13:
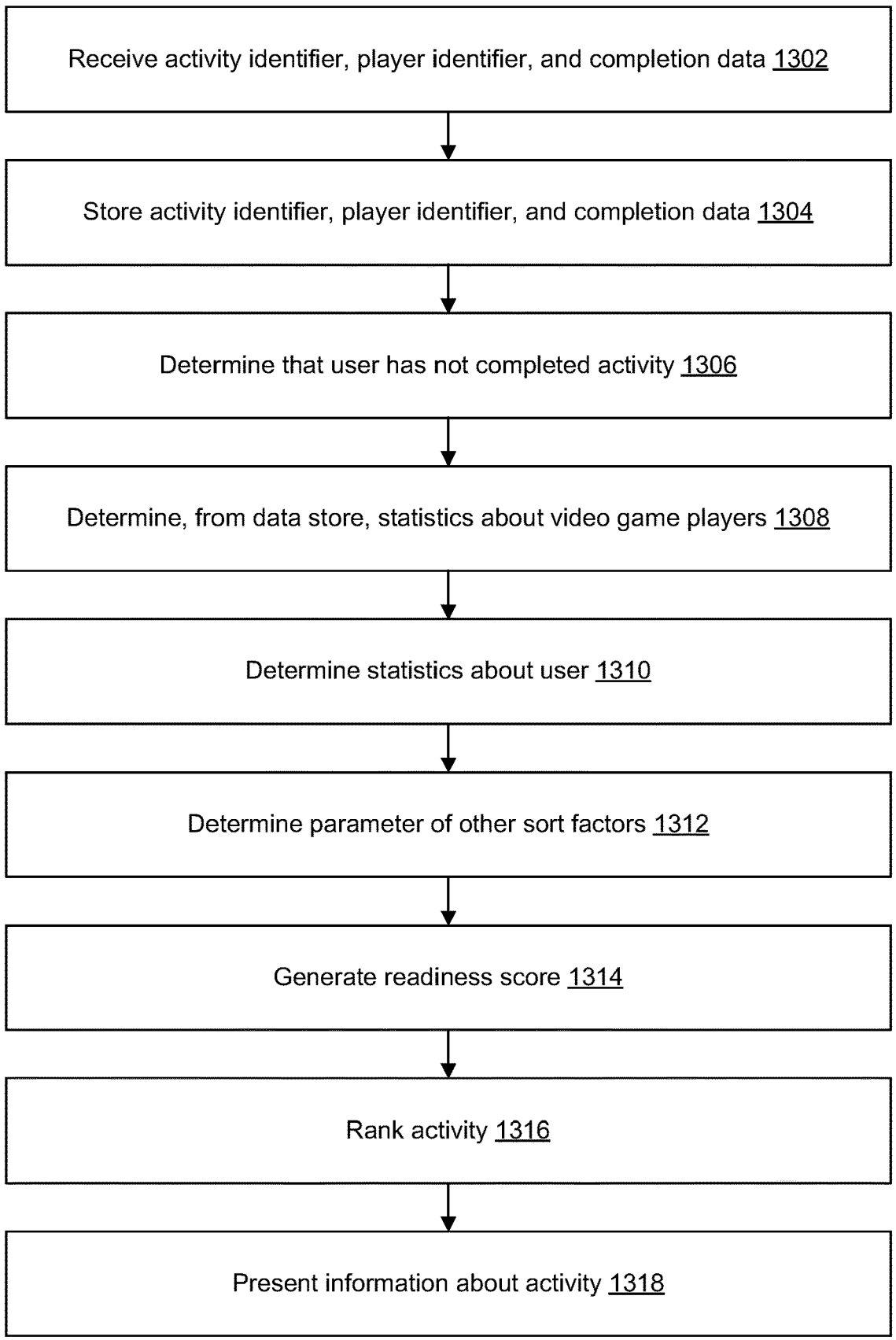
FIG. 13 illustrates another example of a flow for suggesting an activity based on sort factors that include statistics, according to embodiments of the present disclosure.

FIGS. 11-13 illustrate example flows for suggesting an activity. The operations of the flows can be implemented as hardware circuitry and/or stored as computer-readable instructions on a non-transitory computer-readable medium of a computer system, such as a video game console and/or a video game platform. As implemented, the instructions represent modules that include circuitry or code executable by a processor(s) of the computer system. The execution of such instructions configures the computer system to perform the specific operations described herein. Each circuitry or code in combination with the processor represents a means for performing a respective operation(s). While the operations are illustrated in a particular order, it should be understood that no particular order is required and that certain operations can be omitted.

FIG. 11 illustrates an example of a flow for suggesting an activity, according to embodiments of the present disclosure. In an example, the flow includes operation 1102, where the computer system determines candidate activities, some or all of which may be suggested upon further analysis. For instance, the computer system determines activities that are available to the user and that the user has not performed (based on properties of activity objects and/or properties of events about the activities and collected in association with a user identifier of the user). These activities form the set of candidate activities.

In an example, the flow includes operation 1104, where the computer system removes spoiler activities from the set of candidate activities. For instance, the computer system determines, for each of the candidate activities, whether the candidate activity contains a spoiler (e.g., based on properties of the activity object and/or event data collected for the user). If so, the candidate activity is removed from the set.

In an example, the flow includes operation 1106, where the computer system determines a readiness score per candidate activity from the set. For instance, the event data stored for a plurality of video game players and the user, the user's user profile, the video game player's profiles, the user's game play history, and/or the video game players' game play histories can be analyzed according to sort factors to generate the readiness score as described in connection with FIG. 10.

In an example, the flow includes operation 1108, where the computer system rank the candidate activities. For instance, the candidate activities are ordered according to their respective readiness scores.

In an example, the flow includes operation 1110, where the computer system presents activity suggestions. For instance, the computer system selects a predetermined number of the candidate activities (e.g., the three highest ranked candidate activities or some other number). The computer system sends information about the selected candidate activities to one or more computing devices of the user. Activity suggestions corresponding to these activities are presented from the information as GUI elements within GUIs of one or more computing devices of the user and presented thereat, as illustrated in connection with FIGS. 6-9.

In an example, the flow includes operation 1112, where the computer system launches an activity. For instance, a user selection of an activity suggestion presented on a GUI is received by the computer system from a computing device of the user. Program code corresponding to that activity can be executed based on the user selection. However, and as explained herein above, the embodiments of the present disclosure are not limited as such. For instance, the activity can be launched locally on the computing device.

FIG. 12 illustrates another example of a flow for suggesting an activity based on sort factors that include mechanics, according to embodiments of the present disclosure. In an example, the flow includes operation 1202, where the computer system receives an activity identifier, a player identifier, and a mechanic identifier. For instance, the activity identifier corresponds to an activity performed by a video game player in a video game (e.g., by operating a computing device). The player identifier corresponds to the video game player. The mechanic identifier corresponds to a mechanic used in the activity. The activity identifier and the mechanic identifier are predefined in program code of the video game. The activity identifier, the player identifier, and the mechanic identifier are received based on an execution of the program code. In an illustration, the activity identifier and the mechanic identifier are received as one or more events from the computing device of the video game player.

In an example, the flow includes operation 1204, where the computer system stores the identifier and the mechanic identifier in a data store. For instance, the activity identifier and the mechanic identifier are stored as event data in association with the player identifier. Over time, the computer system stores activity identifiers and mechanic identifiers for a plurality of activities and mechanics and in association with a plurality of player identifiers corresponding to a plurality of video game players. Other possible events and/or properties of events can also be received and stored, such as outcomes of performing the activities and impacts of the used mechanics.

In an example, the flow includes operation 1206, where the computer system determines that a user has not completed the activity. For instance, the computer system determines that the activity is a candidate activity that does not include a spoiler, similarly to operations 1102-1104 of FIG. 11.

In an example, the flow includes operation 1208, where the computer system determines, from the data store, mechanics used by the plurality of video game players to perform the activity. For instance, the activity identifier is used to look up the stored event data about the activity. This event data is statistically analyzed to determine, for each of the mechanics (ad indicated by the corresponding mechanic identifier), a statistical measurement (e.g., a frequency, a distribution, etc.) of use of that mechanic by video game players and, possibly, outcomes of the activity (e.g., success, failure) and/or impact of using the mechanic.

In an example, the flow includes operation 1210, where the computer system determines mechanics available to user. For instance, the mechanic identifiers determined from the event data at operation 1208 can be used in a look up of the user profile and or an inventory of mechanics available to the user to determine matches between the mechanics used by the video game players and the mechanics available to the user. The computer system can generate an individual score for the mechanics based on the matches and the statistical measurement (e.g., if ninety percent of the video game players used a particular mechanic to positively impact the activity and if that mechanic is available to the user, the individual score can be relatively high to other mechanics).

In an example, the flow includes operation 1212, where the computer system determines parameters of other sort factors. For instance, these sort factors include user propensity, new activity, expiring activity, in-game characteristics, location, completion time, and developer priority as described in connection with FIG. 10. The event data stored, the user's user profile, the video game player's profiles, the user's game play history, and/or the video game players' game play histories can be analyzed according to how the parameters of the sort factors are met and to generate individual scores corresponding to these sort factors as described in connection with FIG. 10.

In an example, the flow includes operation 1214, where the computer system generates a readiness score. For instance, a weighted sum of the individual scores is performed and the result is set as the readiness score.

In an example, the flow includes operation 1216, where the computer system ranks the activity relative to other candidate activities. This operation is similar to operation 1108 of FIG. 11.

In an example, the flow includes operation 1218, where the computer system presents information about the activity as an activity suggestion. This operation is similar to operation 1110 of FIG. 11.

FIG. 13 illustrates another example of a flow for suggesting an activity based on sort factors that include statistics, according to embodiments of the present disclosure. The flow is similar to the flow of FIG. 12, except that details for generating an individual score from statistics about video game players and the user are described. The two flows can be used in conjunction. For instance, the individual score generated based on mechanics as in FIG. 12 can be combined with the individual score generated based on the statistics as in FIG. 13 to generate a mechanic/in-game characteristic score as in FIG. 10, and the mechanic/in-game characteristic score can be used to generate the readiness score.

In an example, the flow of FIG. 13 includes operation 1302, where the computer system receives an activity identifier, a player identifier, and completion data. For instance, the activity identifier corresponds to an activity performed by a video game player in a video game (e.g., by operating a computing device). The activity identifier is predefined in program code of the video game. The completion data includes properties related to the activity, such as its start, end, outcome, and the like. Additionally or alternatively, the completion data includes in-game characteristics of the video game player, a context of the video game player in the video game, and/or a context of the video game player on a video game platform. The player identifier corresponds to the video game player. The activity identifier and the player identifier, and the completion data are received based on an execution of the program code. In an illustration, the activity identifier and the completion data are received as one or more events from the computing device of the video game player.

In an example, the flow includes operation 1304, where the computer system stores the identifier and the completion data in a data store. For instance, the activity identifier and the completion data are stored as event data in association with the player identifier. Over time, the computer system stores activity identifiers and completion data for a plurality of activities in association with a plurality of player identifiers corresponding to a plurality of video game players. Other possible events and/or properties of events and/or types of completion data can also be received and stored.

In an example, the flow includes operation 1306, where the computer system determines that a user has not completed the activity. For instance, the computer system determines that the activity is a candidate activity that does not include a spoiler, similarly to operations 1102-1104 of FIG. 11.

In an example, the flow includes operation 1308, where the computer system determines, from the data store, statistics about the plurality of video game players that performed the activity. For instance, the activity identifier is used to look up the stored event data about the activity. This event data is statistically analyzed to determine a statistical measurement (e.g., a frequency, a distribution, etc.) of in-game characteristics, video game contexts, and/or video game platform contexts of the plurality of video game players and, possibly, outcomes of the activity (e.g., success, failure). To illustrate, the statistics may indicate that ninety percent of video game players playing at an expert level successfully completed the activity, whereas only fort percent of video game players playing at a beginner level were successful.

In an example, the flow includes operation 1310, where the computer system determines statistics about the user. For instance, the computer system can look up the user profile of the user and/or perform a statistical analysis of the user's game play history to determine the user's in-game characteristics. The computer system can also determine the user's video game context and/or video game platform context based on current user interactions with the user's computing device and/or applications being executed on the computing device or on the video game platform. The computer system can also determine matches between the in-game characteristics, video game context, and video game platform context of the user and those of the video game players. The computer system can generate an individual score for the statistics based on the matches and the statistical measurement (e.g., if the user is playing at an expert level, the individual score is relatively high, whereas if the user is playing at beginner level, the individual score is relatively low).

In an example, the flow includes operation 1312, where the computer system determines parameters of other sort factors. For instance, these sort factors include user propensity, new activity, expiring activity, mechanics, location, completion time, and developer priority as described in connection with FIG. 10. The event data stored, the user's user profile, the video game player's profiles, the user's game play history, and/or the video game players' game play histories can be analyzed according to how the parameters of the sort factors are met and to generate individual scores corresponding to these sort factors as described in connection with FIG. 10.

In an example, the flow includes operation 1314, where the computer system generates a readiness score. For instance, a weighted sum of the individual scores is performed and the result is set as the readiness score.

In an example, the flow includes operation 1316, where the computer system ranks the activity relative to other candidate activities. This operation is similar to operation 1108 of FIG. 11.

In an example, the flow includes operation 1318, where the computer system presents information about the activity as an activity suggestion. This operation is similar to operation 1310 of FIG. 11.

Figure 14:
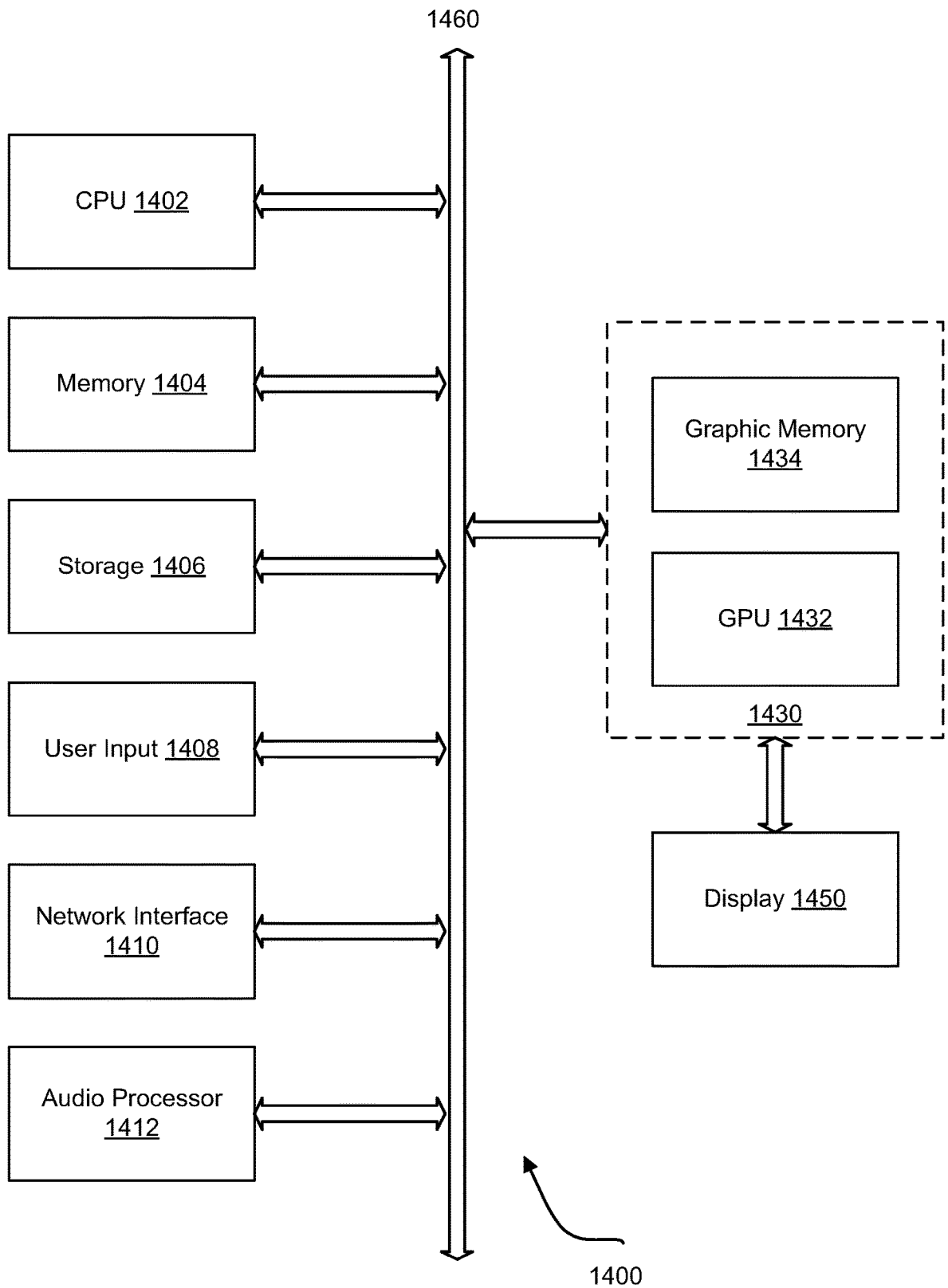
FIG. 14 illustrates an example of a hardware system suitable for implementing a computer system, according to embodiments of the present disclosure.

FIG. 14 illustrates an example of a hardware system suitable for implementing a computer system 1400, according to embodiments of the present disclosure. The computer system 1400 represents, for example, a video game console, a video game platform, or other types of a computer system. The computer system 1400 includes a central processing unit (CPU) 1402 for running software applications and optionally an operating system. The CPU 1402 may be made up of one or more homogeneous or heterogeneous processing cores. Memory 1404 stores applications and data for use by the CPU 1402. Storage 1406 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 1408 communicate user inputs from one or more users to the computer system 1400, examples of which may include keyboards, mice, joysticks, touch pads, touch screens, still or video cameras, and/or microphones. Network interface 1410 allows the computer system 1400 to communicate with other computer systems via an electronic communications network, and may include wired or wireless communication over local area networks and wide area networks such as the Internet. An audio processor 1412 is adapted to generate analog or digital audio output from instructions and/or data provided by the CPU 1402, memory 1404, and/or storage 1406. The components of computer system 1400, including the CPU 1402, memory 1404, data storage 1406, user input devices 1408, network interface 1410, and audio processor 1412 are connected via one or more data buses 1460.

A graphics subsystem 1430 is further connected with the data bus 1460 and the components of the computer system 1400. The graphics subsystem 1430 includes a graphics processing unit (GPU) 1432 and graphics memory 1434. The graphics memory 1434 includes a display memory (e.g., a frame buffer) used for storing pixel data for each pixel of an output image. The graphics memory 1434 can be integrated in the same device as the GPU 1432, connected as a separate device with the GPU 1432, and/or implemented within the memory 1404. Pixel data can be provided to the graphics memory 1434 directly from the CPU 1402. Alternatively, the CPU 1402 provides the GPU 1432 with data and/or instructions defining the desired output images, from which the GPU 1432 generates the pixel data of one or more output images. The data and/or instructions defining the desired output images can be stored in the memory 1404 and/or graphics memory 1434. In embodiments, the GPU 1432 includes 3D rendering capabilities for generating pixel data for output images from instructions and data defining the geometry, lighting, shading, texturing, motion, and/or camera parameters for a scene. The GPU 1432 can further include one or more programmable execution units capable of executing shader programs.

The graphics subsystem 1430 periodically outputs pixel data for an image from the graphics memory 1434 to be displayed on the display device 1450. The display device 1450 can be any device capable of displaying visual information in response to a signal from the computer system 1400, including CRT, LCD, plasma, and OLED displays. The computer system 1400 can provide the display device 1450 with an analog or digital signal.

In accordance with various embodiments, the CPU 1402 is one or more general-purpose microprocessors having one or more processing cores. Further embodiments can be implemented using one or more CPUs 1402 with microprocessor architectures specifically adapted for highly parallel and computationally intensive applications, such as media and interactive entertainment applications.

The components of a system may be connected via a network, which may be any combination of the following: the Internet, an IP network, an intranet, a wide-area network ("WAN"), a local-area network ("LAN"), a virtual private network ("VPN"), the Public Switched Telephone Network ("PSTN"), or any other type of network supporting data communication between devices described herein, in different embodiments. A network may include both wired and wireless connections, including optical links. Many other examples are possible and apparent to those skilled in the art in light of this disclosure. In the discussion herein, a network may or may not be noted specifically.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although ech may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable mediums for storing information. The term "computer-readable medium" includes, but is not limited to, portable or fixed storage devices, optical storage devices, wireless channels, a sim card, other smart cards, and various other mediums capable of storing, containing, or carrying instructions or data.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain. "About" includes within a tolerance of ±0.01%, ±0.1%, ±1%, ±2%, ±3%, ±4%, ±5%, ±8%, ±10%, ±15%, ±20%, ±25%, or as otherwise known in the art. "Substantially" refers to more than 66%, 155%, 80%, 90%, 95%, 99%, 99.9% or, depending on the context within which the term substantially appears, value otherwise as known in the art.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method implemented by a computer system, the method including:
    receiving, by the computer system, an activity identifier of an activity in a video game, a player identifier of a video game player that completed the activity, and a mechanic identifier of a mechanic used by the video game player to complete the activity, wherein:
        the mechanic includes at least one of: a set of tools, a set of capabilities, or a set of skills available in the video game,
        the activity identifier and the mechanic identifier are predefined in program code of the video game, and
        the activity identifier, the player identifier, and the mechanic identifier are received based on an execution of the program code;
    storing, by the computer system, the activity identifier, the player identifier, and the mechanic identifier in a data store;
    determining, by the computer system, that a user has not completed the activity;
    determining, by the computer system, from the data store and based on the activity identifier, at least one of: mechanics of video game players that completed the activity, or statistics about characteristics of the video game players in the video game;
    determining, by the computer system, at least one of: mechanics available to the user, or statistics about characteristics of the user in the video game;
    generating, by the computer system, a readiness score for the user to complete the activity based on at least one of: the mechanics of the video game players and the mechanics of the user, or the statistics of the video game players and the statistics of the user;
    ranking, by the computer system, based on the readiness score, the activity relative to other activities in the video game that have not been completed by the user and are available to the user; and
    presenting information about the activity on a device of the user based on the ranking.

2. The method of claim 1, wherein presenting the information includes presenting a user interface element that suggests the activity to the user and that embeds a selectable link to launch the activity in the video game.

3. The method of claim 1, wherein presenting the information includes presenting a user interface element that suggests the activity to the user and that embeds a selectable link to view a completion of the activity in the video game.

4. The method of claim 1, further including:
estimating a length of time for completing the activity by the user based on a type of the activity and data about actual completion times of the video game players, wherein the activity is ranked further based on the estimated length of time.

5. The method of claim 4, wherein presenting the information includes identifying the activity and showing the estimated length of time.

6. The method of claim 1, wherein ranking the activity includes:
generating a total score for the activity based on a weighted sum of individual scores, wherein each individual score corresponds to a sort factor applied to the activity and is associated with a weight; and
determining that the activity has the highest total score among the other activities.

7. The method of claim 6, wherein weights associated with the sort factors are personalized to the user.

8. The method of claim 6, wherein weights associated with the sort factors are predefined based on a developer of the video game.

9. The method of claim 6, wherein weights associated with the sort factors are adjusted based on an activity selection history of the video game players.

10. The method of claim 6, wherein the sort factors include a readiness of the user to complete the activity and at least one of: a length of time estimated for the user to complete the activity, a propensity to play a type of the activity, a first availability date of the activity, an expiration date of the activity, a virtual zone within the video game for the activity, and a developer-defined priority of the activity.

11. A computer system including:
one or more processors; and
one or more memories storing computer-readable instructions that, upon execution by the one or more processors, configure the computer system to:
receive an activity identifier of an activity in a video game, a player identifier of a video game player that completed the activity, and a mechanic identifier of a mechanic used by the video game player to complete the activity, wherein:
the mechanic includes at least one of: a set of tools, a set of capabilities, or a set of skills available in the video game,
the activity identifier and the mechanic identifier are predefined in program code of the video game, and
the activity identifier, the player identifier, and the mechanic identifier are received based on an execution of the program code;
store the activity identifier, the player identifier, and the mechanic identifier in a data store;
determine that a user has not completed the activity;
determine, from the data store and based on the activity identifier, at least one of:
mechanics of video game players that completed the activity, or statistics about characteristics of the video game players in the video game;
determine at least one of: mechanics available to the user, or statistics about characteristics of the user in the video game;
generate a readiness score for the user to complete the activity based on at least one of: the mechanics of the video game players and the mechanics of the user, or the statistics of the video game players and the statistics of the user;
rank, based on the readiness score, the activity relative to other activities in the video game that have not been completed by the user and are available to the user; and
present information about the activity on a device of the user based on the ranking.

12. The computer system of claim 11, wherein ranking the activity includes:
generating a total score for the activity based on individual scores generated for sort factors and weights associated with the sort factors, wherein the sort factors include a readiness of the user to complete the activity.

13. The computer system of claim 12, wherein the readiness score is generated for the readiness of the user by at least one of:
determining a match between a first mechanic used by the video game players to complete the activity and a second mechanic available to the user; or
determining that the statistics of the video players indicate a characteristic of the video game players when the activity was completed and that the statistics of the user when playing the video game include the characteristic.

14. The computer system of claim 13, wherein the readiness score is generated further based on a history of the user using the second mechanic in the video game.

15. One or more non-transitory computer-readable storage media storing instructions that, upon execution on a computer system, cause the computer system to perform operations including:
receiving an activity identifier of an activity in a video game, a player identifier of a video game player that completed the activity, and a mechanic identifier of a mechanic used by the video game player to complete the activity, wherein:
the mechanic includes at least one of: a set of tools, a set of capabilities, or a set of skills available in the video game,
the activity identifier and the mechanic identifier are predefined in program code of the video game, and
the activity identifier, the player identifier, and the mechanic identifier are received based on an execution of the program code;
storing the activity identifier, the player identifier, and the mechanic identifier in a data store;
determining that a user has not completed the activity;
determining, from the data store and based on the activity identifier, at least one of:
mechanics of video game players that completed the activity, or statistics about characteristics of the video game players in the video game;
determining at least one of: mechanics available to the user, or statistics about characteristics of the user in the video game;
generating a readiness score for the user to complete the activity based on at least one of:
the mechanics of the video game players and the mechanics of the user, or the statistics of the video game players and the statistics of the user;
ranking, based on the readiness score, the activity relative to other activities in the video game that have not been completed by the user and are available to the user; and
presenting information about the activity on a device of the user based on the ranking.

16. The one or more non-transitory computer-readable storage media of claim 15, wherein ranking the activity includes:

generating a total score for the activity based on individual scores generated for sort factors, wherein the individual scores include the readiness score and a propensity score, wherein the propensity score is generated by at least:
  determining a type of the activity from a plurality of types, the plurality of types including a progress activity, a competitive activity, a challenge activity, and an open ended activity; and
  determining a history of the user completing the type of activity.

17. The one or more non-transitory computer-readable storage media of claim 15, wherein ranking the activity includes:
generating a total score for the activity based on individual scores generated for sort factors, wherein the individual scores include the readiness score and a location score, wherein the location score is generated by at least:
  determining a virtual zone within the video game where the activity was completed; and
  determining that a virtual location of the user in the video game is within the virtual zone.

18. The one or more non-transitory computer-readable storage media of claim 15, wherein ranking the activity includes:
generating a total score for the activity based on individual scores generated for sort factors, wherein the individual scores include the readiness score and a location score, wherein the location score is generated by at least:
  determining a first coordinate within the video game associated with the completion of the activity by the video game players;
  determining a second coordinate of the user within the video game; and
  determining that a difference between the first coordinates and the second coordinate is less than a distance threshold.

19. The one or more non-transitory computer-readable storage media of claim 15, wherein ranking the activity includes:
generating a total score for the activity based on individual scores generated for sort factors, wherein the individual scores include the readiness score and a playtime length score, wherein the playtime length score is generated by at least:
  estimating a length of time of the activity; and
  determining a propensity to select the activity based on the length of time and on at least one of: a selection history of activities by the video game players or a selection history of activity by the user.

20. The one or more non-transitory computer-readable storage media of claim 15, wherein the other activities include a second activity, wherein the operations further include:
  determining that the second activity includes a spoiler for the user; and
  ranking the second activity lower than the activity based on the spoiler.

* * * * *